United States Patent
Kusumura et al.

(10) Patent No.: US 8,275,783 B2
(45) Date of Patent: Sep. 25, 2012

(54) CONVERSION PROGRAM SEARCH SYSTEM AND CONVERSION PROGRAM SEARCH METHOD

(75) Inventors: Yukitaka Kusumura, Tokyo (JP); Toshiyuki Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 305 days.

(21) Appl. No.: 12/671,001

(22) PCT Filed: Jul. 30, 2008

(86) PCT No.: PCT/JP2008/063673
§ 371 (c)(1),
(2), (4) Date: Jan. 27, 2010

(87) PCT Pub. No.: WO2009/017158
PCT Pub. Date: Feb. 5, 2009

(65) Prior Publication Data
US 2010/0191760 A1    Jul. 29, 2010

(30) Foreign Application Priority Data
Aug. 1, 2007 (JP) .................................. 2007-200852

(51) Int. Cl.
G06F 7/00 (2006.01)
G06F 17/30 (2006.01)

(52) U.S. Cl. .................................................. 707/758
(58) Field of Classification Search .................. None
See application file for complete search history.

(56) References Cited

U.S. PATENT DOCUMENTS

| | | | |
|---|---|---|---|
| 5,870,052 A * | 2/1999 | Dedic et al. | 341/161 |
| 6,243,174 B1 * | 6/2001 | Fukasawa | 358/530 |
| 6,292,937 B1 * | 9/2001 | Sakata et al. | 717/116 |
| 6,578,187 B2 * | 6/2003 | Yasuda | 716/102 |
| 6,675,373 B1 * | 1/2004 | Croslin | 717/136 |
| 6,725,225 B1 * | 4/2004 | Kori | 707/693 |
| 6,836,773 B2 * | 12/2004 | Tamayo et al. | 1/1 |
| 6,868,423 B2 * | 3/2005 | Ohta et al. | 1/1 |
| 7,117,208 B2 * | 10/2006 | Tamayo et al. | 707/777 |
| 7,155,503 B2 * | 12/2006 | Ishihara et al. | 709/223 |

(Continued)

FOREIGN PATENT DOCUMENTS
JP    2003162533 A    6/2003

(Continued)

OTHER PUBLICATIONS

International Search Report for PCT/JP2008/063673 mailed Oct. 21, 2008.

(Continued)

Primary Examiner — Usmaan Saeed

(57) ABSTRACT

To provide a conversion program search system that can increase the reusability of conversion programs as well as can find a solution to a data connection problem in a short time. A first-signature generation means 71 generates a first signature indicating, in a binary manner, whether one piece of data meets each of predetermined multiple description formats. A second-signature generation means 72 generates a second signature of a conversion program, based on the difference between the first signatures of conversion-source data and post-conversion data. When a conversion path candidate generation means 74 generates a candidate for a solution to a data connection problem, an evaluation value calculation means 75 calculates the evaluation value of the candidate using the second signature. A conversion path identification means 76 tries conversion paths to serve as a solution in the descending order of the evaluation values.

16 Claims, 27 Drawing Sheets

U.S. PATENT DOCUMENTS

| | | | |
|---|---|---|---|
| 7,275,079 B2* | 9/2007 | Brodsky et al. | 709/203 |
| 8,150,627 B2* | 4/2012 | Fan et al. | 702/19 |
| 2002/0108092 A1* | 8/2002 | Yasuda | 716/1 |
| 2002/0174135 A1* | 11/2002 | Pellegrin et al. | 707/200 |
| 2003/0018646 A1* | 1/2003 | Ohta et al. | 707/100 |
| 2003/0137695 A1* | 7/2003 | Nomizu | 358/1.16 |
| 2004/0249863 A1* | 12/2004 | Kawamura | 707/104.1 |
| 2005/0091201 A1* | 4/2005 | Snover et al. | 707/3 |
| 2005/0091258 A1* | 4/2005 | Snover et al. | 707/102 |
| 2005/0102292 A1* | 5/2005 | Tamayo et al. | 707/10 |
| 2006/0047652 A1* | 3/2006 | Pandit et al. | 707/6 |
| 2006/0101058 A1* | 5/2006 | Chidlovskii | 707/102 |
| 2006/0159421 A1* | 7/2006 | Sukeda et al. | 386/83 |
| 2007/0266366 A1* | 11/2007 | Bucuvalas | 717/104 |
| 2008/0059398 A1* | 3/2008 | Tsutsui | 707/1 |
| 2010/0191760 A1* | 7/2010 | Kusumura et al. | 707/760 |

FOREIGN PATENT DOCUMENTS

JP  2005534107 A  11/2005

OTHER PUBLICATIONS

R Dhamankar et al., "iMAP: Discovering Complex Semantic Matches between Database Schemas", Proceedings of ACM SIGMOD 2004, pp. 383-394.

T. Yoshikawa et al, "Service Group for Flexible Interface Adaptation among Web Services", Transactions of Information Processing Society of Japan. Dec. 15, 2004, vol. 45, No. 12, pp. 2782-2791.

* cited by examiner

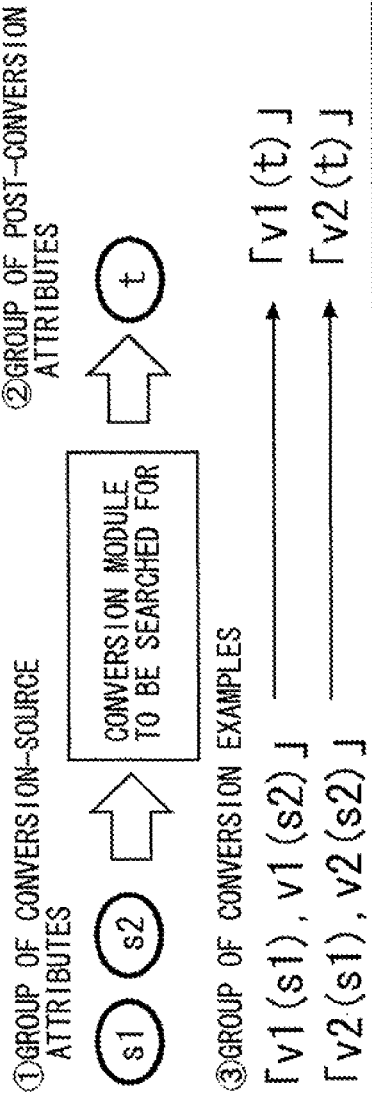
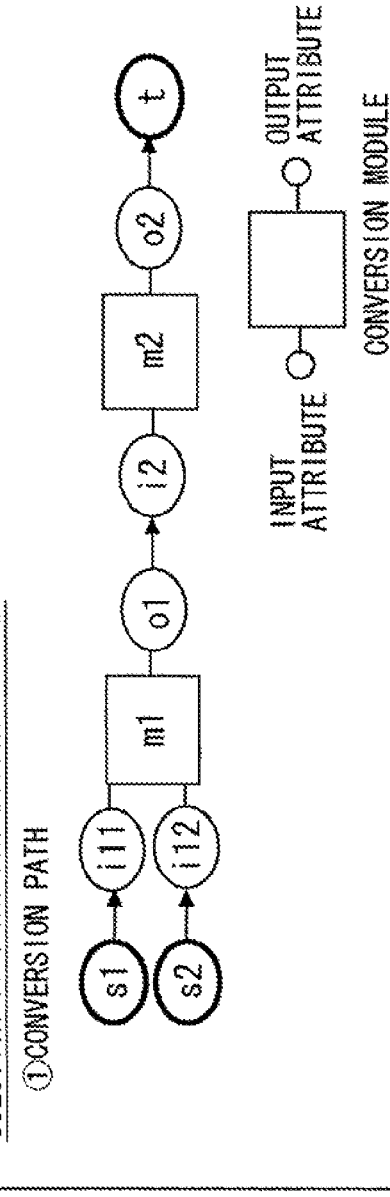
Fig. 2A
Fig. 2B

| WORD 1 | WORD 2 | RELATIONSHIP |
|---|---|---|
| NAMAE | FULL NAME | SYNONYM |
| ADDRESS | CITY/TOWN/VILLAGE | SYNONYM |

Fig. 4

| DESCRIPTION FORMAT ID | NAME | TYPE | CONDITIONAL EXPRESSION | |
|---|---|---|---|---|
| d0001 | KANJI | CHARACTER STRING | isKanji(value); | ← CHARACTER STRING IS KANJI |
| d0002 | HIRAGANA | CHARACTER STRING | isKana(value); | ← CHARACTER STRING IS HIRAGANA |
| d0003 | ALPHABET | CHARACTER STRING | isAlpabet(value); | ← CHARACTER STRING IS DESCRIBED USING ALPHABETS |
| d0004 | CAMELCASE | CHARACTER STRING | isCamelCase(value); | ← CHARACTER STRING IS DESCRIBED IN CAMELCASE |
| ... | ... | ... | ... | |
| d00011 | 1 CHARACTER | CHARACTER STRING | value.length=1 | ← DESCRIBED IN ONE CHARACTER |
| d00012 | 2 CHARACTERS | CHARACTER STRING | value.length=2 | ← DESCRIBED IN TWO CHARACTERS |
| ... | ... | ... | ... | |
| d00021 | 10-20 CHARACTERS | CHARACTER STRING | value.length>=10 and value.length<20 | ← DESCRIBED IN 10 TO 20 CHARACTERS |
| d00022 | EMAIL | CHARACTER STRING | Pattern([a-zA-Z0-9_¥.¥-]+?@[A-Za-z0-9_¥.¥-]+).match(value) | ← CHARACTER STRING IS BASED ON REGULAR EXPRESSION [a-zA-Z0-9_¥.¥-]+?@[A-Za-z0-9_¥.¥-]+ |

Fig. 5

| MODULE ID | MODULE NAME | INPUT ATTRIBUTE | INPUT ATTRIBUTE TYPE | OUTPUT ATTRIBUTE | OUTPUT ATTRIBUTE TYPE | EXECUTION DEFINITION INFORMATION | CONVERSION SIGNATURE |
|---|---|---|---|---|---|---|---|
| m0001 | SEX CODE CONVERSION | [SEIBETSU] | [String] | [SEIBETSU] | [String] | http://localhost/code/genderchange.wsdl | [0, 1, 1, 0, -1,..., 0, -1] |
| m0002 | CHARACTER STRING CONNECTION CONVERSION | [X, X] | [String, String] | [X] | [String] | c:/string.concat.wsdl | [1, 0, -1, 0, 1,..., 0, -1]<br>[1, 1, 0, 0, 1,..., 0, -1] |

Fig. 6

| EXAMPLE ID | CONVERSION MODULE ID | INPUT ATTRIBUTE VALUE | OUTPUT ATTRIBUTE VALUE |
|---|---|---|---|
| r0001 | m0001 | SEIBETSU [DANSEI] | SEIBETSU [MALE] |
| r0002 | m0002 | X [TANAKA]<br>X [TAROU] | X [TAROU TANAKA] |

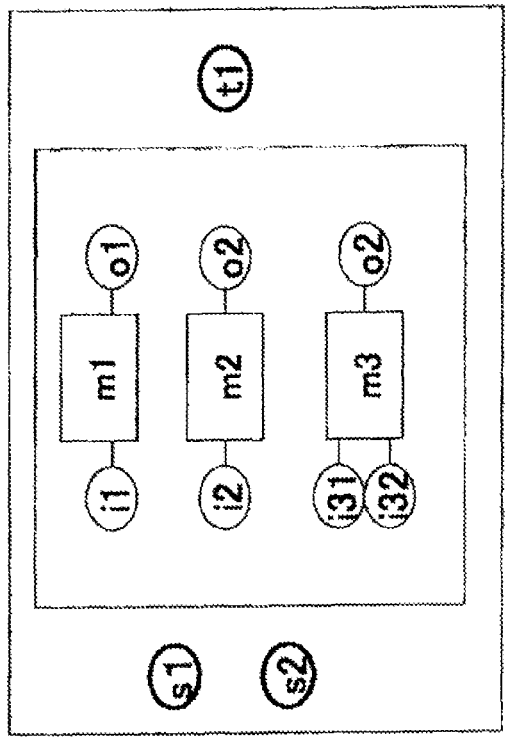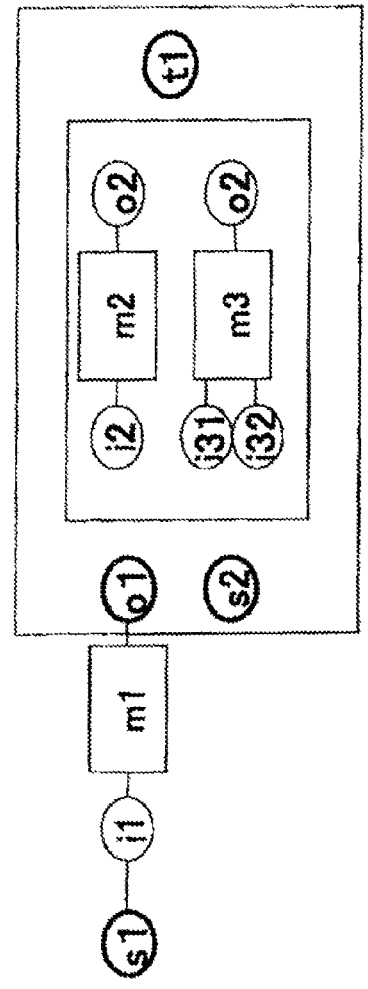
Fig. 12A
Fig. 12B

```
countUp(S,T,M){
        UCSL=S;
        UCTML=M+T;
        CL=empty;
        connect(UCSL,UCTML,CL);
}
connect(UCSL, UCTML, CL){
        if(UCSL=empty OR UCTML=empty){
          if(UCSL=empty AND UCTML=empty){
                  GENERATE CONVERSION PATH BASED ON CL;
                  ADD CONVERSION PATH TO L;
                  return;
          }else{  return;}
        }else{
           for(each m ∈ UCTML){
                   if(m ∈ M){
                        for (PERMUTATION P EXTRACTING |in(m)| NUMBER
                        OF ATTRIBUTES FROM each UCSL) {
                                TCL=CL;
                                CONNECT ATTRIBUTES IN P AND in(m)
                                IN APPEARANCE ORDER AND ADD TO TCL;
                                TUCSL=UCSL-P+out(m);
                                TUCTML=UCTML-m;
                                connect(TUCSL, TUCMTL,TCL);
                        }
                   }
                   if(m ∈ T){
                      for(each p ∈ UCSL){
                              TCL=CL;
                              CONNECT p AND m AND ADD TO TCL ;
                              TUCSL=UCSL-p;
                              TUCMTL=UCMTL-m;
                              connect(TUCSL, TUCMTL,TCL);
                      }
                   }
           }
        }
}
```

Fig. 13

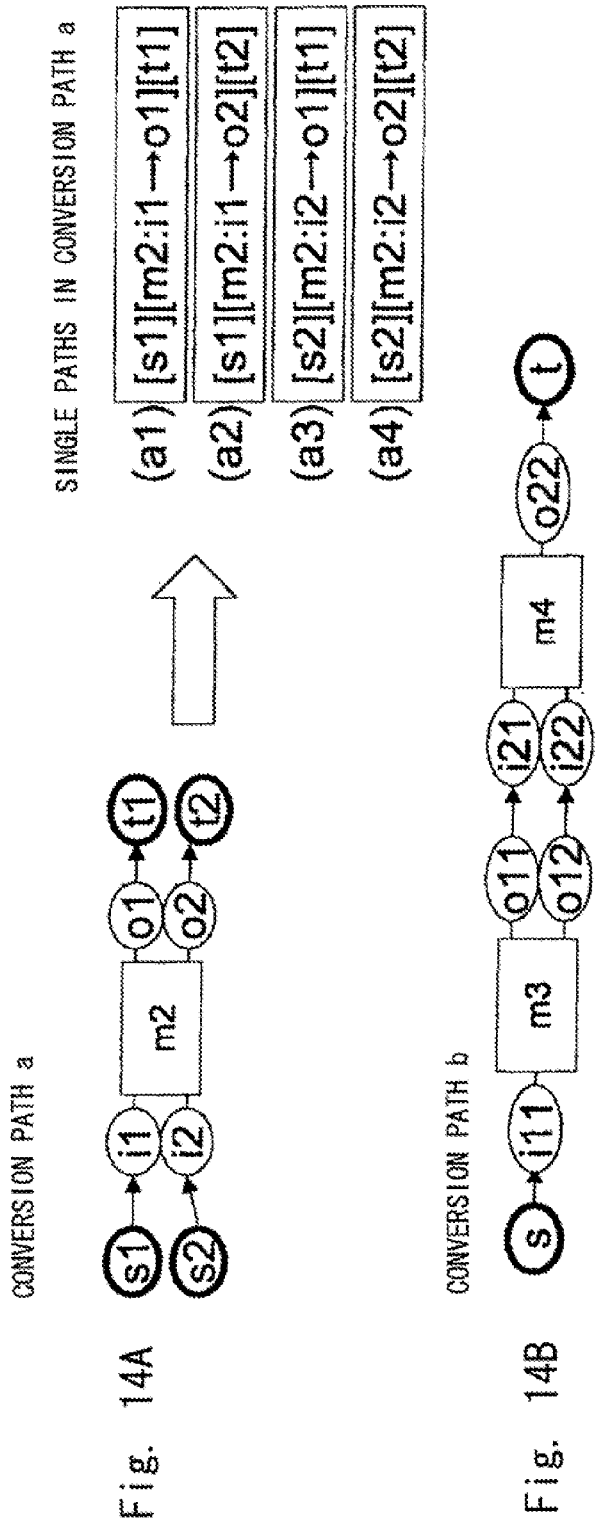

| CONVERSION MODULE NAME | INPUT ATTRIBUTE (TYPE) | OUTPUT ATTRIBUTE (TYPE) | CONVERSION EXAMPLE |
|---|---|---|---|
| CHARACTER STRING CONNECTION | X (string)<br>X (string) | X (string) | "TANAKA," "TAROU"<br>=> "TAROU TANAKA" |
| 1-CHARACTER EXTRACTION | X (string) | X (string) | "female" => "f" |
| 2-CHARACTER EXTRACTION | X (string) | X (string) | "1207" => "12" |
| 3-CHARACTER EXTRACTION | X (string) | X (string) | "Monday" => "Mon" |
| MULTIPLICATION CONVERSION | X (int)<br>X (int) | X (int) | "1000," "100" => "100000" |
| SEX CONVERSION A | SEIBETSU (string) | SEIBETSU (string) | "DANSEI" => "MALE" |
| SEX CONVERSION B | SEIBETSU (string) | SEIBETSU (string) | "MALE" => "DANSEI" |
| REGION CLASSIFICATION | PREFECTURE NAME (string) | REGION (string) | "NARA PREFECTURE" => "KINKI" |
| PREFECTURE NAME EXTRACTION | CHARACTER STRING (string) | PREFECTURE NAME (string) | "... IKOMA CITY, NARA PREFECTURE"<br>=> "NARA PREFECTURE" |
| AGE RANGE CLASSIFICATION A | AGE (string) | AGE RANGE (string) | "27" => "20s" |
| EMPLOYEE DB REFERENCE CONVERSION | EMAIL (string) | TELEPHONE NUMBER (string) | "tanaka@x.com" => "0743-xxx" |

Fig. 15

| INPUT ATTRIBUTE VALUE | OUTPUT ATTRIBUTE VALUE |
|---|---|
| SEIBETSU [DANSEI] | SEIBETSU [MALE] |
| SEIBETSU [JOSEI] | SEIBETSU [FEMALE] |
| SEIBETSU [TANAKA] | ERROR |
| SEIBETSU [... IKOMA CITY, NARA PREFECTURE] | ERROR |

Fig. 16

| ATTRIBUTE VALUE | PARTS OF ATTRIBUTE VALUE SIGNATURE | | | | | | | |
|---|---|---|---|---|---|---|---|---|
| | KANJI | KANA | ALPHA | 1 CHARACTER | 2 CHARACTER | 3 CHARACTER | 4 CHARACTER | 5 CHARACTER | 6 CHARACTER |
| "DANSEI" | 1 | 0 | 0 | 0 | 1 | 0 | 0 | 0 | 0 |
| "MALE" | 0 | 0 | 1 | 0 | 0 | 0 | 1 | 0 | 0 |
| "JOSEI" | 1 | 0 | 0 | 0 | 1 | 0 | 0 | 0 | 0 |
| "FEMALE" | 0 | 0 | 1 | 0 | 0 | 0 | 0 | 0 | 1 |

Fig. 17

| KANJI | KAWA | ALPHA | | 1 | 2 | 3 | 4 | 5 | 6 | |
|---|---|---|---|---|---|---|---|---|---|---|
| | | | a | CHARACTER | CHARACTER | CHARACTER | CHARACTER | CHARACTER | CHARACTER | |
| -1 | 0 | 1 | | 0 | -1 | 0 | 0.5 | 0 | 0.5 | CONVERSION SIGNATURE |

Fig. 18

· SEIBETSU [DANSEI] => SEX [m]

| CONVERSION MODULE NAME | INPUT ATTRIBUTE VALUE | OUTPUT ATTRIBUTE VALUE | ELEMENTS IN CONVERSION SIGNATURE ||||||||||
|---|---|---|---|---|---|---|---|---|---|---|---|
| | | | KANJI | KANA | ALPHA | 1 | 2 | 3 | 4 | 5 | 6 |
| | | | | | a | CHARACTER | CHARACTER | CHARACTER | CHARACTER | CHARACTER | CHARACTER |
| 1-CHARACTER EXTRACTION | X (string) | X (string) | 0 | 0 | 0 | 1 | 0 | 0 | 0 | 0 | 0 |
| 2-CHARACTER EXTRACTION | X (string) | X (string) | 0 | 0 | 0 | 0 | 1 | 0 | 0 | 0 | 0 |
| 3-CHARACTER EXTRACTION | X (string) | X (string) | 0 | 0 | 0 | 0 | 0 | 1 | 0 | 0 | 0 |
| SEX CONVERSION A | SEIBETSU (string) | SEIBETSU (string) | −1 | 0 | 1 | 0 | −1 | 0 | 0.5 | 0 | 0.5 |
| SEX CONVERSION B | SEIBETSU (string) | SEIBETSU (string) | 1 | 0 | −1 | 0 | 1 | 0 | −0.5 | 0 | −0.5 |

Fig. 19

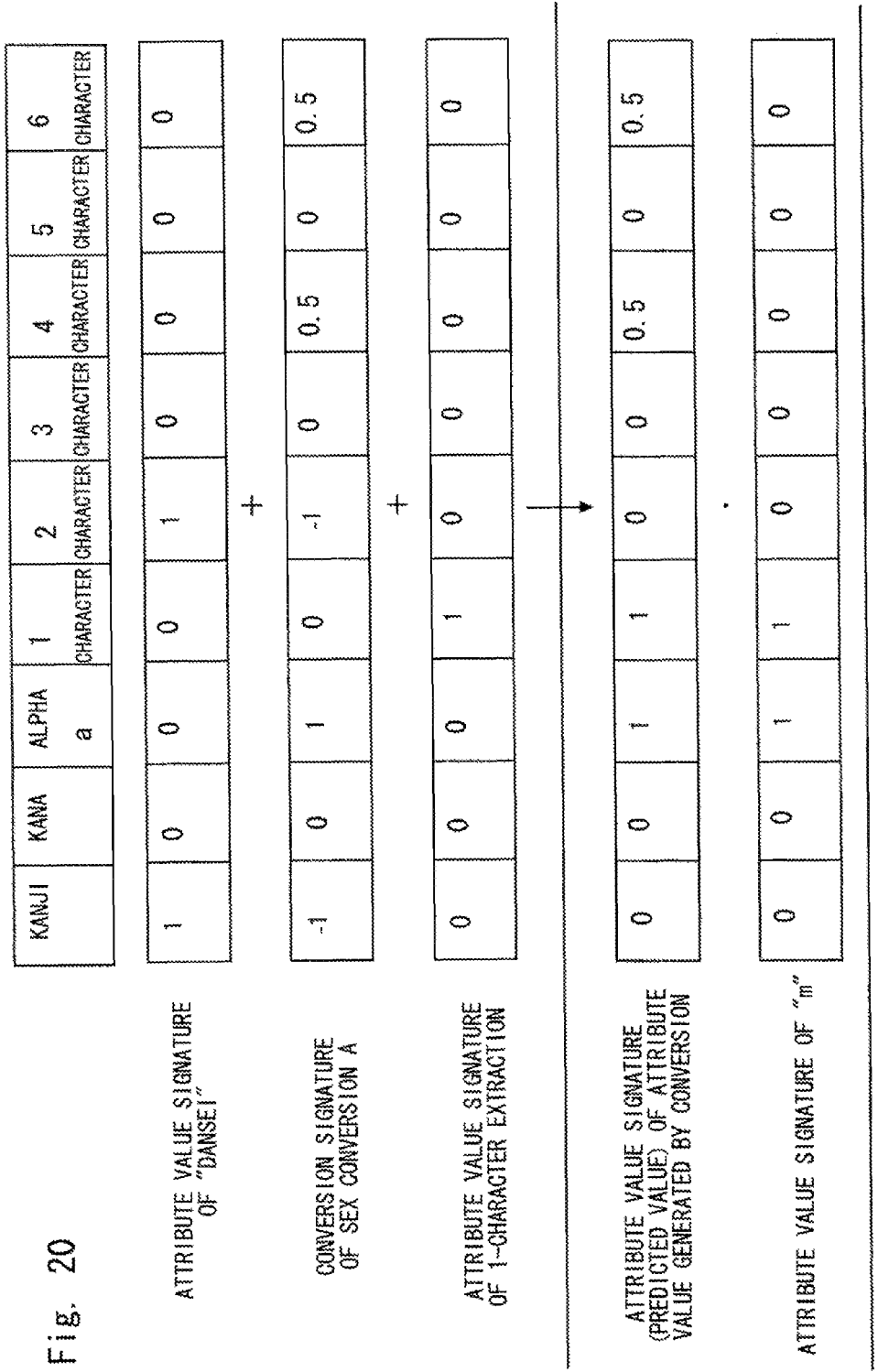

| ITEM | SEX CONVERSION A | 1-CHARACTER EXTRACTION | NEW CONVERSION MODULE |
|---|---|---|---|
| MODULE NAME | SEX CONVERSION A | 1-CHARACTER EXTRACTION CONVERSION | SEX CONVERSION A - 1 -CHARACTER EXTRACTION CONVERSION |
| INPUT ATTRIBUTE | [SEIBETSU] | [X] | [SEIBETSU] |
| INPUT ATTRIBUTE TYPE | [String] | [String] | [String] |
| OUTPUT ATTRIBUTE | [SEIBETSU] | [X] | [SEIBETSU] |
| OUTPUT ATTRIBUTE TYPE | [String] | [String] | [String] |
| EXECUTION DEFINITION INFORMATION | http://localhost/code/ genderchange.wsdl | c:/string.contact.wsdl | [m0001], [m0002] |

Fig. 22

TABLE A

| NAME | SEIBETSU | TELEPHONE | ADDRESS |
|---|---|---|---|
| TAROU TANAKA | DANSEI | 0774xxxx | IKOMA CITY, NARA PREFECTURE |
| | | | |
| | | | |

TABLE B

| FIRST NAME | FAMILY NAME | SEX | TEL | POS |
|---|---|---|---|---|
| | | | | |
| TAROU | TANAKA | M | 0774xxxx | 610-xxxx |
| | | | | |
| | | | | |

Fig. 27

CONVERSION PROGRAM SEARCH SYSTEM AND CONVERSION PROGRAM SEARCH METHOD

TECHNICAL FIELD

The present invention relates to a conversion program search system, a conversion program search method, and a conversion program search program that search among multiple conversion programs for converting data description formats, for a conversion program matching an inputted condition.

BACKGROUND ART

In recent years, technologies such as Web services, SOA (service oriented architecture), EAI (enterprise application integration), ESB (enterprise service bus) have been developed as fundamental technologies for operating multiple computer systems in a linked manner. These are technologies that enable passing data between systems by unifying data formats using XML (extensible markup language) or the like. However, even when unifying data formats, systems cannot be simply linked. This is caused by inconsistencies in data representation methods.

Four terms "attribute," "attribute name," "attribute value," and "schema" are defined as follows. An "attribute" refers to a concept that represents a characteristic of an object or event of the real world when representing the object or event as data. For example, in generating data about a human, "namae (meaning "name" in Japanese)" or "seibetsu (meaning "sex" in Japanese)," which is a characteristic of the human, is an attribute. An "attribute name" is a term that is used to represent what is represented by an attribute. That is, an "attribute name" is a term serving as the name of an attribute. For example, in using a name or sex as an attribute in order to represent a human as data, a term "namae" or term "seibetsu" is an attribute name. An "attribute value" is the value of a characteristic specified by an attribute (the value of a characteristic that is an attribute). For example, "Tarou Tanaka" for the attribute "namae" and "male" for the attribute "seibetsu" are attribute values.

A "schema" contains multiple attributes that define an object or event of the real world and have defined attribute names. Also, in a schema, the description formats of attribute values are defined. Examples of a schema defining a "human" include a schema that contains four attributes having attribute names "name," "address," "seibetsu," and "age" and defined by a rule for describing the attribute values of attributes, such as "seibetsu has a value 'otoko (meaning "male" in Japanese)' or value 'onna (meaning "female" in Japanese)'."

The inconsistencies in data representation methods mean that the schema used to represent data varies among the creators of data. Specific examples of such an inconsistency include an example where a piece of data having an attribute name "namae," of pieces of personal information data is handled as an attribute name "name" in another service. Another example is one where an attribute value representing the time is described as "2006/09/06" in one piece of data and described as "Sep. 6 (2006)" in a difference format in another piece of data. Yet another example is one where the rule for describing attribute names and attribute values varies among databases or data warehouses, as in a case where information handled as two attributes "hourly wage" "working hours" in one database is handled as one attribute "salary" in another data warehouse.

As seen, in a case where multiple computer systems are operating in a company, each system defines data using a specific schema. Accordingly, data indicating the same fact often has different attribute names among the systems or the rule for describing attribute values often varies thereamong. For this reason, in order to transfer data from a system A to a system B and link the systems, there is a need to find a method for converting data represented using the schema of the system A into data represented using the schema of the system B. In this specification, such a problem will be referred to as a "schema integration problem."

For example, Patent Document 1 describes a system for solving schema integration problems. The system described in Patent Document 1 converts multiple schemas into abstract schema graphs and converts all or some of the abstract schema graphs, according to a predetermined rule. Also, the system matches class names or attribute names defined by the abstract graphs with each other, generates integrated abstract schema graphs, based on the matching results, and converts the generated integrated abstract schema graphs into integrated schemas.

Actual schema integration problems are often caused by the difference between the attribute value description rules. FIG. 1 is a diagram showing an example of schemas that have different attribute value description formats. In FIG. 1, an example is shown where a conversion-source schema (source schema) S including pieces of employee information that requires conversion is converted into an intended schema (target schema) T. In the source schema S shown in FIG. 1, the attribute value of an attribute having an attribute name "family name" is a family name and the attribute value of an attribute having an attribute name "first name" is a first name. On the other hand, in the target schema T, the attribute value of an attribute having an attribute name "namae" is a full name. Accordingly, there is a need to connect the character strings, that is, connect the attribute value of the attribute having the attribute name "family" in the source schema S and the attribute value of the attribute having the attribute name "first name" therein and use the connected character strings as the attribute value of the attribute having the attribute name "namae". Also, in the source schema S, the attribute value of an attribute having an attribute name "seibetsu" is "dansei" (meaning "male" in Japanese) or "josei" (meaning "female" in Japanese); in the target schema T, the attribute value of an attribute having an attribute name "seibetsu" is "m" or "f." Accordingly, conversions such as a conversion from "dansei" into "m" must be performed. Similarly, with respect to other attributes illustrated in FIG. 1, there is a need to perform various conversions such as one where a prefecture name is extracted from an address and the prefecture name is converted into a region name such as "Kinki" and one where an age such as "22" is converted into an age group such as "20 s." As seen, if the schemas have different attribute value description formats, it is necessary to not only simply find correspondences between attribute values but also convert attribute values between the corresponding attributes.

Hereafter, an attribute having an attribute name "A" may be referred to as 'an attribute of an attribute name "A."'

Non-Patent Document 1 describes an example of a schema integration system that converts data automatically in cases where the schemas have different attribute value description rules. The system described in Non-Patent Document 1 includes multiple searcher modules for performing fundamental data conversions (character string connection, four fundamental operations, etc.), an evaluator module that determines whether the result of a data conversion performed by each searcher module is correct, and a search unit that searches for a proper conversion method in a searching manner using the searchers and evaluator.

The system described in Non-Patent Document 1 operates as follows. When receiving a pair of data sets (tentatively, referred to as "S" and "T") represented by different schemas, the search unit searches for a set of searchers that convert attribute values in the S into the schema of the T. This search is performed as follows. First, the system generates a pair of attributes (tentatively, referred to as "s1") in the S and attributes (tentatively, referred to as "t1") in the T (step 1). Next, the system tries to perform data conversion on the attribute value set of s1 using any searcher (step 2). Also, the system compares values obtained from the conversions with a set of the attribute values of the t1 using the evaluator and checks whether these values are similar to each other (step 3). If these values are highly similar to each other, the system determines that it has found correspondences between these attributes as well as a conversion method and outputs the searcher module used in the try as an inter-attribute conversion method and ends the search. If the similarities between the post-conversion values of the attributes s1 and the attribute values of the target attributes t1 are low, the system returns to step 1, generates another pair of attributes, and performs the same steps. Except for the above-mentioned cases, the system performs data conversions using each searcher again while using the conversion results of the s1 as inputs, and performs step 3 again. As seen, the system described in Non-Patent Document 1 tries data conversions in a searching manner until it obtains correct conversions, so as to obtain a conversion method.

[Patent Document 1]
Japanese Unexamined Patent Application Publication No. 2003-162533 (paragraphs 0065 to 0069, FIG. 3)

[Non-Patent Document 1]
Robin Dhamalekar, Yoonkyong Lee, AnHai Doan, Alon Halevy, Pe dro Domingos, "iMAP: Discovering Complex Semaletic Matches between Database Schemas," Proceedings of ACM SIGMOD, pp. 383 to 394, 2004.

DISCLOSURE OF INVENTION

Technical Problem

While the system described in Patent Document 1 associates attributes with each other, it cannot address schema integration problems where the attribute value description formats are different. As described above, if the attribute value description formats are different, there is a need to convert attribute values between the corresponding attributes. For this reason, the user must describe conversion scripts or conversion rules. However, in order to do this work, the user must understand the details of the schemas and then prepare conversion rules manually, taking time and effort in the schema integration work. As for the technology described in Non-Patent Document 1, a technology for searching for multiple searcher modules for converting attribute values is described in Non-Patent Document 1.

Here, a data connection problem, which is a subtask of a schema integration problem, is defined. A data connection problem is to search for a data conversion program (hereafter referred to as a conversion module) required to perform conversions while using, as input data, a set of conversion-source attributes, a set of post-conversion attributes, and a set of examples where attribute values of the conversion-source attributes have been converted into attribute values of the post-conversion attributes. A conversion path including one or more conversion modules serves as a solution to the data connection problem. A conversion path is information indicating the relationship among conversion-source attribute values, conversion-destination attribute values, input attribute values of one or more conversion modules, and output attribute values of the one or more conversion modules. "Conversion-source" refers to "pre-conversion."

FIG. 2 includes a drawing showing an example of a data connection problem and a drawing showing an example of a conversion path. FIG. 2A is a drawing showing an example of a data connection problem. Ovals shown in FIG. 2 represent attributes, and character strings in the ovals represent attribute names. In an example shown in FIG. 2A, conversion-source attributes are an attribute value having an attribute name "s1" and an attribute value having an attribute name "s2." A post-conversion attribute is an attribute having an attribute name "t." Also, it is assumed that the result of a conversion performed using, as inputs, $v1(s1)$, which is an attribute value of the attribute having the attribute name "s1," and $v1(s2)$, which is an attribute value of the attribute having the attribute name "s2," is $v1(t)$. Similarly, it is assumed that the result of a conversion performed using, as inputs, $v2(s1)$, which is an attribute value of the attribute having the attribute name "s1," and $v2(s2)$, which is an attribute value of the attribute having the attribute name "s2," is $v2(t)$. As seen, a search for a conversion module (conversion program) that converts an attribute value(s) of a conversion-source attribute(s) into an attribute value(s) of a post-conversion attribute(s) is a data connection problem.

FIG. 2B schematically shows an example of a conversion path. Rectangles shown in FIG. 2B represent conversion modules. Shown on the left side of each conversion module is an attribute represented by an input attribute value(s) of the conversion module. Shown on the right side of each conversion module is an attribute represented by an attribute value outputted from the conversion module. In FIG. 2B, for example, an attribute value of an attribute having an attribute name "i11" and an attribute value of an attribute having an attribute name "i12" are inputted into a conversion module "m1," and these attribute values are converted into an attribute value of an attribute name "o1." Accordingly, the conversion path schematically shown in FIG. 2B represents the following relationships. That is, an attribute value of the attribute of the attribute name "s1" and an attribute value of the attribute of the attribute name "s2" are inputted into the conversion module m1 as an attribute value of the attribute of the attribute name "i11" and an attribute value of the attribute of the attribute name "i12." The conversion module m1 converts the inputted attribute values into the attribute value of the attribute name "o1." That attribute value is inputted into a conversion module m2 as an attribute value of an attribute of an attribute name "i2." The conversion module m2 converts the inputted attribute value into an attribute value of an attribute of an attribute name "o2." That attribute value is an attribute value of the attribute of the attribute name "t."

Generating conversion modules in advance and using the conversion modules as a solution to a data connection problem will be referred to as "reuse of the conversion modules." Examples of reuse of a conversion module include using a conversion module generated to solve a certain data connection problem, in order to solve another data connection problem. In order to make a conversion module reusable, it is conceivable to add, to the conversion module, metadata as to the difference between description formats that can be solved by the conversion module and keep the conversion module detectable in preparation for other data connection problems. However, the difference in data description format between systems occurs because humans do not recognize the difference between the data description formats. This prevents generation of general-purpose metadata intended to determine whether conversion modules are included as solutions to various data connection problems. Accordingly, the reusability of conversion modules is restrained.

Also, the system described in Non-Patent Document 1 tries conversion modules until it attains success (obtains a conversion result similar to the target attribute value). For this reason, even when conversion modules are reusable, the system described in Non-Patent Document 1 takes much processing time in a case where the number of conversion modules that are solution candidates is increased and therefore the number of tries of conversion modules is increased or a case where a solution to a data connection problem uses multiple conversion modules. In other words, it takes much time to find a solution to a data connection problem.

Accordingly, an object of the present invention is to provide a conversion program search system, a conversion program search method, and a conversion program search program that can increase the reusability of conversion modules (conversion programs) as well as can find a solution to a data connection problem in a short time.

Technical Solution

In order to attain the above-mentioned object, the present invention has the following characteristics.

A conversion program search system of the present invention is a conversion program search system that, according to a name of conversion-source data, a name of post-conversion data, and a conversion example including the conversion-source data and the post-conversion data, identifies a conversion path which is information indicating a relationship among the conversion-source data, the post-conversion data, input data of one or more conversion programs, and output data outputted by the one or more conversion programs, the conversion program search system comprising: first-signature generation means that generates a first signature which is information indicating, in a binary manner, whether one piece of data meets each of a predetermined plurality of description formats; second-signature generation means that generates a second signature based on a difference between the first signature of the conversion-source data and the first signature of the post-conversion data generated by the first-signature generation means, the second signature being metadata about a conversion program; program information storage means that stores names of input data and output data of a conversion program, execution definition information for executing the conversion program, and the second signature generated by the second-signature generation means; program candidate selection means that, when receiving the name of the conversion-source data, the name of the post-conversion data, and the conversion example including the conversion-source data and the post-conversion data, selects candidates for conversion programs to be used in a data conversion process, based on a similarity between the received conversion-source data name and the name of the input data of the conversion program and a similarity between the received post-conversion data name and the name of output data of the conversion program; conversion path candidate generation means that, with respect to combinations of the candidates selected by the program candidate selection means, associates the name of the conversion-source data with a name of input data of a conversion program and associates a name of output data of the conversion program with the name of the post-conversion data and that, when a combination of the selected candidates includes a plurality of conversion programs, generates a conversion path candidate by associating a name of output data of a conversion program with a name of input data of another candidate conversion program; evaluation value calculation means that calculates evaluation values of conversion path candidates based on the second signature of a conversion program and a conversion example, the conversion program having associated names of input data and output data with a name of another piece of data; and conversion path identification means that selects the conversion path candidates in the descending order of the evaluation values, converts the received conversion-source data in the order of conversion programs determined by the selected conversion path and, when a result of the conversion is the received post-conversion data, identifies the selected conversion path candidate as a conversion path matching the received conversion-source data name, post-conversion data name, and conversion example.

A conversion program search method of the present invention is a conversion program search method for, according to a name of conversion-source data, a name of post-conversion data, and a conversion example including the conversion-source data and the post-conversion data, identifying a conversion path which is information indicating a relationship between the conversion-source data, the post-conversion data, input data of one or more conversion programs, and output data outputted by the one or more conversion programs, the conversion program search method comprising: generating a first signature with respect to each of the conversion-source data and the post-conversion data, by using first-signature generation means, the first signature being information indicating, in a binary manner, whether one piece of data meets each of a predetermined plurality of description formats; generating a second signature based on a difference between the first signature of the conversion-source data and the first signature of the post-conversion data generated by the first-signature generation means, by using second-signature generation means, the second signature being metadata about a conversion program; storing the second signature in program information storage means, by using the second-signature generation means, the program information storage means previously storing names of input data and output data of a conversion program and execution definition information for executing the conversion program; when receiving a name of conversion-source data, a name of post-conversion data, and a conversion example including conversion-source data and post-conversion data, selecting a conversion program candidate to be used in a data conversion process, based on a similarity between the received conversion-source data name and a name of input data of a conversion program and a similarity between the received post-conversion data name and a name of output data of the conversion program, by using program candidate selection means; with respect to combinations of the candidates selected by the program candidate selection means, associating a name of conversion-source data with a name of input data of a conversion program and associating a name of output data of a conversion program with a name of a post-conversion data, by using conversion path candidate generation means and, when a combination of the selected candidates contains a plurality of conversion programs, generating a conversion path candidate by associating a name of output data of a conversion program with a name of input data of another candidate conversion program, by using the conversion path candidate generation means; calculating an evaluation value of the conversion path candidate based on the second signature of a conversion program and a conversion example, by using evaluation value calculation means, the conversion program having associated names of input data and output data with a name of another piece of data; and selecting a conversion path candidate in the descending order of the evaluation values, converting the received conversion-source data in the order of conversion programs determined by the selected conversion paths, by using conversion path identification means and, when a result of the conversion is the received post-conversion data, identifying the selected conversion path candidate as a conversion path matching the received conversion-source data name, post-conversion data name, and conversion example, by using the conversion path identification means.

A conversion program search program of the present invention a conversion program search program for causing a computer to, according to a name of conversion-source data, a name of post-conversion data, and a conversion example including the conversion-source data and the post-conversion data, identify a conversion path which is information indicating a relationship among the conversion-source data, the post-conversion data, input data of one or more conversion programs, and output data outputted by the one or more conversion programs, the computer including program information storage means storing a names of input data and output data of a conversion program and execution definition information for executing the conversion program, the conversion program search program causing the computer to perform: a first signature generation process of generating a first signature with respect to each of the conversion-source data and the post-conversion data, the first signature being information indicating, in a binary manner, whether one piece of data meets each of a predetermined plurality of description formats; a second signature generation process of generating a second signature based on a difference between the first signature of the conversion-source data and the first signature of the post-conversion data generated in the first-signature generation process, the second signature being metadata about a conversion program; a second signature storage process of storing the second signature in program information storage means; a program candidate selection process of, when receiving the name of the conversion-source data, the name of the post-conversion data, and the conversion example including the conversion-source data and the post-conversion data, selecting candidates for conversion programs to be used in a data conversion process, based on a similarity between the received conversion-source data name and a name of input data of a conversion program and a similarity between the received post-conversion data name and an name of output data of the conversion program; a conversion path candidate generation process of, with respect to combinations of the candidates selected in the program candidate selection process, associating the name of the conversion-source data with the name of the input data of the conversion program and associating the name of the output data of the conversion program with the name of the post-conversion data and, when a combination of the selected candidates contains a plurality of conversion programs, generating conversion path candidates by associating the name of the output data of the conversion program with a name of input data of another candidate conversion program; an evaluation value calculation process of calculating evaluation values of the conversion path candidates based on the second signature of a conversion program and the conversion example, the conversion program having associated names of input data and output data with a name of another piece of data; and a conversion path identification process of selecting a conversion path candidate in the descending order of the evaluation values, converting the received conversion-source data in the order of conversion programs determined by the selected conversion path, and, when a result of the conversion is the received post-conversion data, identifying the selected conversion path candidate as a conversion path matching the received conversion-source data name, post-conversion data name, and conversion example.

Advantageous Effects

The present invention can increase the reusability of conversion programs as well as can find a solution to a data connection problem in a short time.

BRIEF DESCRIPTION OF DRAWINGS

FIG. 2A is a diagram showing an example of a data connection problem and a drawing showing an example of a conversion path.

FIG. 2B is a diagram showing an example of a data connection problem and a drawing showing an example of a conversion path.

FIG. 4 is a diagram showing an example of information representing the relationships between terms serving as attribute names.

FIG. 5 is a diagram showing an example of description format knowledge.

FIG. 6 is a diagram showing an example of information stored in the conversion module storage unit.

FIG. 12A is a diagram showing an example of the progress of a process of connecting between attributes.

FIG. 12B is a diagram showing an example of the progress of a process of connecting between attributes.

FIG. 13 is a drawing showing an example of a process of connecting between attributes to generate a conversion path.

FIG. 14A is a diagram showing an example of single paths.

FIG. 14B is a diagram showing an example of single paths.

FIG. 15 is a diagram showing an example of conversion modules.

FIG. 16 is a diagram showing an example generated with respect to sex conversion A.

FIG. 17 is a diagram showing an example of attribute value signatures.

FIG. 18 is a diagram showing an example of a conversion signature.

FIG. 19 is a diagram showing an example of conversion module candidates selected in step F22.

FIG. 20 is a diagram showing an example calculation of the evaluation value.

FIG. 22 is a diagram showing an example of information about a new module registered in the conversion module storage unit by the conversion module registration unit.

FIG. 27 is a diagram showing an example of a schema integration problem.

Figure 1:
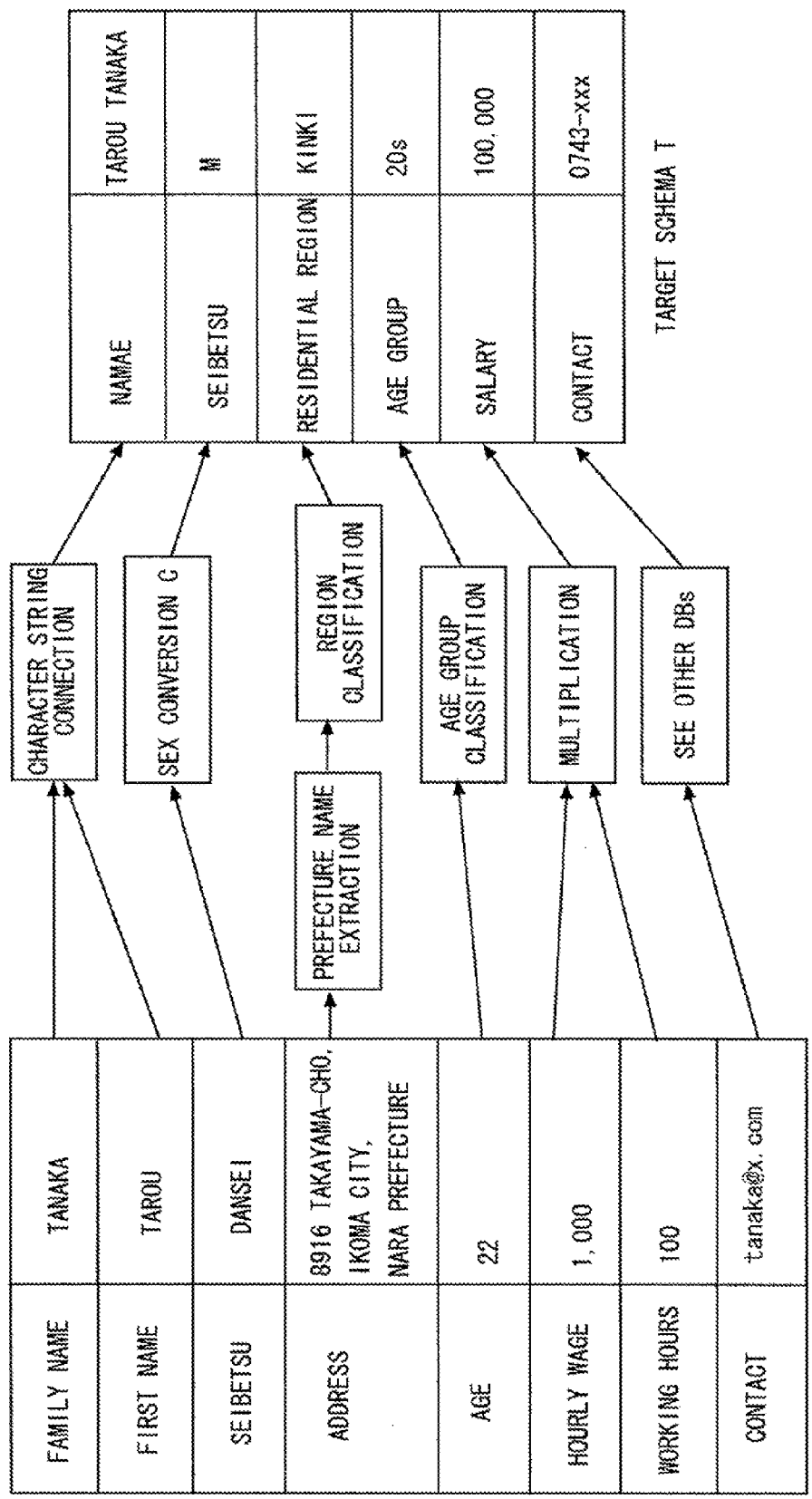
FIG. 1 is a diagram showing an example of schemas that have different attribute value description formats.

EXPLANATION OF REFERENCE.

11 data connection problem input and output unit
12 conversion search means
13 attribute knowledge storage unit
14 description format knowledge storage unit
15 attribute value signature generation means
16 conversion module storage unit
17 conversion module execution means
18 example storage unit
19 conversion signature generation means
20 conversion module registration unit
21 conversion module generation means
23 schema integration unit
231 record comparison unit
232 attribute name similarity obtaining unit
233 schema integration search unit
803 IC card

BEST MODE FOR CARRYING OUT THE INVENTION

Hereafter, embodiments of the present invention will be described with reference to the drawings.

[Embodiment 1]

Figure 3:
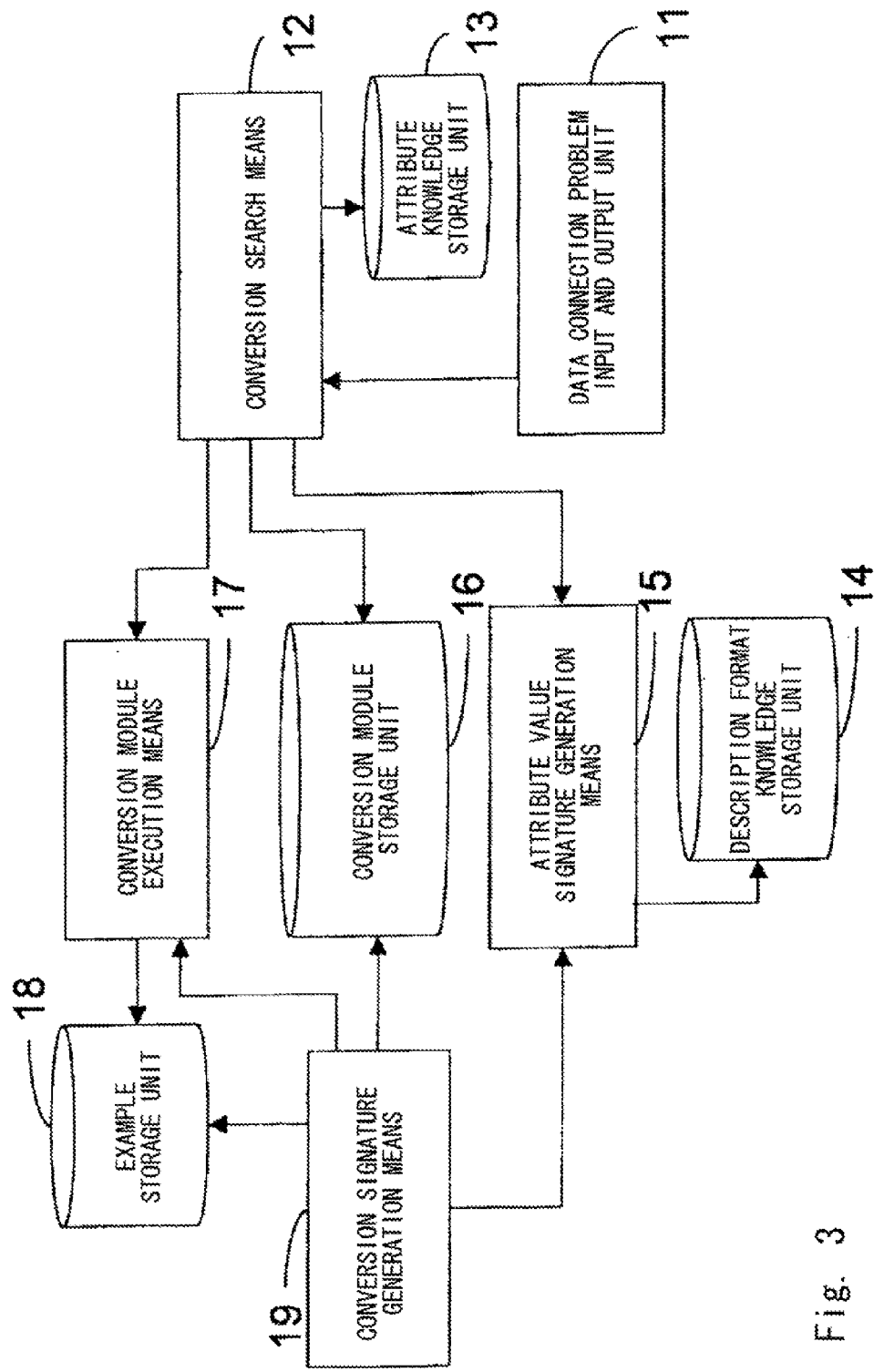
FIG. 3 is a block diagram showing a first embodiment of the present invention.

FIG. 3 is a block diagram showing a first embodiment of a conversion program search system according to the present invention. The conversion program search system of the first embodiment includes a data connection problem input and output unit 11, conversion search means 12, an attribute knowledge storage unit 13, a description format knowledge storage unit 14, attribute value signature generation means 15, a conversion module storage unit 16, conversion module execution means 17, an example storage unit 18, and conversion signature generation means 19.

The data connection problem input and output unit 11 receives a data connection problem and outputs a conversion path, which is a solution to the data connection problem. "Receives a data connection problem" refers to receiving one or more conversion-source attribute names, one or more post-conversion attribute names, and a set of attribute value conversion examples (that is, a set of pairs of a conversion-source attribute value and a post-conversion attribute value). The data connection problem input and output unit 11 is operated, for example, by an external system or a user. The data connection problem input and output unit 11 is realized, for example, by an input device such as a keyboard and an output device such as a display device. Alternatively, the data connection problem input and output unit 11 may be an input interface with an external system.

When receiving the data connection problem, the data connection problem input and output unit 11 passes the data connection problem (one or more conversion-source attribute names, one or more post-conversion attribute names, and a set of attribute value conversion examples) on to the conversion search means 12. The conversion search means 12 searches for a solution to the data connection problem. The data connection problem input and output unit 11 presents the solution obtained by the conversion search means 12, to the external system or user.

When receiving the data connection problem from the data connection problem input and output unit 11, the conversion search means 12 searches for a conversion path, which is a solution to the data connection problem, and sends the conversion path to the data connection problem input and output unit 11. The upper limit value of the number of conversion modules included in a conversion path, which is a solution to a data connection problem, is defined as a search distance D. The search distance D is predetermined.

In order to select conversion modules (conversion programs), which are the elements of a conversion path, the conversion search means 12 reads information about conversion modules from the conversion module storage unit 16. Also, in order to select conversion module candidates, which are the elements of a conversion path, the conversion search means 12 causes the attribute knowledge storage unit 13 to obtain the similarities between the attribute names and thus determines whether there is similarity among the one or more conversion-source attribute names, one or more post-conversion attribute names, the attribute names of the inputted attributes, and the attribute names of the outputted attributes, which have been received as the data connection problem. Then, the conversion search means 12 selects a conversion module having a similarity among the received one or more conversion-source attribute names, one or more post-conversion attribute names, attribute names of the input attributes, and attribute names of the output attribute names. The process is the process of step F22 shown in FIG. 10 and a specific example thereof will be described later. Also, the conversion search means 12 inputs the attribute values (the conversion-source attribute values and post-conversion attribute values included in the set of attribute value conversion examples) received as the data connection problem, to the attribute value signature generation means 15 so as to obtain an attribute value signature. Then, using the attribute value signature, the conversion search means 12 predicts a combination of conversion modules (may be a single conversion module) to be included in a solution conversion path. The attribute value signature will be described later. In order to try the predicted conversion modules, the conversion search means 12 sends, to the conversion module execution means 17, information (execution definition information) for executing the conversion modules as well as the conversion-source attribute values included in the set of attribute value conversion examples. Then, the conversion search means 12 determines whether the conversion results of the conversion-source attribute values obtained by the conversion module execution means 17 match the post-conversion attribute values included in the received set of attribute value conversion examples.

The attribute knowledge storage unit 13 stores information from which the similarities between terms serving as attribute names can be obtained and obtains the similarities between attribute names specified by the conversion search means 12. Examples of information from which the similarities between terms serving as attribute names can be obtained include information representing the relationships between terms serving as attribute names. FIG. 4 shows an example of information representing the relationships between terms serving as attribute names. In FIG. 4, each two terms and information indicating that the two terms are synonyms are combined. The attribute knowledge storage unit 13 stores, for example, a set of such pieces of information. The attribute knowledge storage unit 13 may store a thesaurus (synonym dictionary) or ontology, as the set of pieces of information illustrated in FIG. 4.

When storing a set of combinations of two terms and information indicating that the two terms are synonyms (see FIG. 4), the attribute knowledge storage unit 13 may determine the similarities between the attribute names, according to a predetermined rule. Examples of such a rule include a combination of rules 1 to 3 shown below. If two attribute names are defined as synonyms according to information stored in the attribute knowledge storage unit 13, the similarity is set to 1 (rule 1). Even when two attribute names are not defined as direct synonyms, the similarity is set to 0.5 if a term that is a synonym of one of the two attribute names is a synonym of the other attribute name (rule 2). When two attribute names are not applicable to any of the rules 1 and 2, the similarity is set to 0. For example, when storing the information shown in FIG. 4, the attribute knowledge storage unit 13 may set the similarity between "namae" and "full name" to 1. Also, assume that the information stored in the attribute knowledge storage unit 13 is information where "address" and "city/town/village" are defined as synonyms and "city/town/village" and "destination" are defined as synonyms but "address" and "destination" are not defined as synonyms. At that time, the attribute knowledge storage unit 13 may set the similarity between "address" and "destination" to 0.5, according to the rule 2.

The above-mentioned combination of the rules 1 to 3 is only illustrative and the method for setting a rule is not limited thereto. For example, the attribute knowledge storage unit 13 may sequentially trace synonymous terms from one of two attribute names, the similarity between which is to be determined, to the other attribute name and determine the similarity minutely according to the number of the traced terms.

Examples of information from which the similarities between terms serving as attribute names can be obtained include a corpus (a set of documents). The attribute knowledge storage unit 13 may store a set of documents rather than the information illustrated in FIG. 4. In this case, the attribute storage unit 13 may refer to the stored document set and calculate the similarity according to Formula 1 shown below.

[Formula 1]

$$\mathrm{Sim}(A,B)=(\mathrm{doc}(A,B))2/(\mathrm{doc}(A)\times\mathrm{doc}(B)) \quad \text{Formula (1)}$$

In Formula 1, A and B are attribute names, the similarity between which is to be determined. Sim (A, B) is the similarity between A and B. doc (x) refers to the number of documents including a term x and doc (x, y) refers to the number of documents including both the term x and a term y. Accordingly, the attribute knowledge storage unit 13 retrieves documents including both the two attribute names, the similarity between which is to be determined, from itself and calculates the square (doc (A, B) 2) of the number of the documents. Then, the attribute knowledge storage unit 13 retrieves documents including one of the attribute names, attribute name A, and documents including the other attribute name, attribute name B, divides (doc (A, B))2) by the product (doc (A) x doc (B)) of the number of the documents including the attribute name A and the number of the documents including the attribute name B, and sets the division result for the similarity between the attribute names A and B.

The description format storage unit 14 stores description format knowledge that is information where description formats are defined. Attribute values are determined as to whether each attribute value meets the description formats. In other words, the description formats are conditions and attribute values are determined as to whether each attribute value meets the conditions. The description format knowledge is referred to by the attribute value signature generation means 15. FIG. 5 is a diagram showing an example of description format knowledge. In an example shown in FIG. 5, for each piece of description format knowledge, a description format ID, a description format name, an attribute value data type, and a conditional expression for determining whether an attribute value meets the description format are defined. Among these items, description format IDs are automatically numbered, for example, by the description format knowledge storage unit 14. Names, data types, and conditional expressions are prepared manually in advance. For example, the items are stored in the description format knowledge storage unit 14 by the manager of the conversion program search system (hereafter referred to as the "system manager"). A conditional expression is any expression or function for determining whether an attribute value is described in the description format. For example, "is Kanji(value)" illustrated in FIG. 5 is a function that, using an attribute value as an argument, determines whether the attribute value is a kanji character(s). Also, "value.length" illustrated in FIG. 5 refers to the number of characters contained in a character string, which is an attribute value. Accordingly, "value.length=1" is a conditional expression indicating that the number of characters of an attribute value is 1. A conditional expression may be represented by an OR or AND. The attribute value signature generation means 15 performs functions defined as conditional expressions in the description format knowledge or performs calculations according to the defined expressions. A character string "a-zA-Z0-9 . . . " in the conditional expression of "email" shown in FIG. 5 is described based on a regular expression and refers to a "character string including alphanumeric characters, periods, and @." That is, this conditional expression is a function for determining whether an attribute value is a "character string including alphanumeric characters, periods, and @."

The description format knowledge stored in the description format knowledge storage unit 14 is not limited to what is illustrated in FIG. 5. For example, the description format knowledge storage unit 14 stores description format knowledge that the system manager inputs via a user interface.

The attribute value signature generation means 15 receives specification of one attribute value and generates an attribute value signature of the attribute value. An "attribute value signature" refers to vector data indicating whether an attribute value meets the description formats defined in the description format knowledge storage unit 14. The attribute value signature generation means 15 determines whether an attribute value meets each of the description formats, in the form of true (meet) or false (not meet). In an attribute value signature, which is vector data, 1 s representing true and/or 0 s representing false are arranged in a predetermined order as individual determination results. The number of elements contained in the attribute value signature is the same as the number of pieces of description format knowledge (i.e., number of description formats) stored in the description format knowledge storage unit 14. When receiving specification of one attribute value, the attribute value signature generation means 15 determines whether the attribute value meets each of the conditional expressions of the pieces of description format knowledge stored in the description format knowledge storage unit 14, in the form of 1 representing true or 0 representing false. Then, the attribute value signature generation means 15 generates an attribute value signature by arranging 1 s and/or 0 s, which are the determination results according to the conditional expressions, in a predetermined order.

The attribute value signature generation means 15 is called up by the conversion signature generation means 19 or conversion search means 12. In other words, the attribute value signature creation means 15 receives specification of an attribute value by the conversion signature generation means 19 or conversion search means 12. The attribute value signature generation means 15 generates a conversion signature using the specified attribute value and passes the conversion signature on to the conversion signature generation means 19 or conversion search means 12, which is the caller.

The conversion module storage unit 16 stores information about conversion modules generated by the system manager and conversion signatures added to the conversion modules by the conversion signature generation means 19. FIG. 6 is a diagram showing an example of information stored in the conversion module storage unit 16. The conversion module storage unit 16 stores a module ID, a module name, an input attribute, an input attribute type, an output attribute, an output attribute type, execution definition information, and a conversion signature for each conversion module. A module ID is the identifier of a conversion module. A module name is a name indicating the function of the conversion module. An input attribute is an attribute to be inputted into the conversion module. Specifically, the attribute name of an attribute to be inputted is stored in the conversion module storage unit 16. "X" illustrated in FIG. 6 indicates that any attribute is applicable. An input attribute type is the date type of an attribute value of an input attribute of the conversion module. An output attribute is an attribute to be outputted from the conversion module. Specifically, the attribute name of an attribute to be outputted is stored in the conversion module storage unit 16. An output attribute type is the date type of an attribute value of an attribute to be outputted from the conversion module.

Execution definition information is information for executing the conversion module. In a case where the conversion module is mounted as a program component, the execution definition information is information where the program itself and the method for calling up the program are described. For example, if the conversion module is installed as a Web service, the execution definition information may be a WSDL file. For example, the execution definition information contains information about a device storing the conversion module and information that must be inputted to execute the conversion module.

A conversion signature is data that, for each of the description formats defined by the pieces of description format knowledge stored in the description format knowledge storage unit 14, indicates whether an attribute value is changed into a state meeting the description format or changed into a state not meeting the description format due to a conversion performed by the conversion module or whether a state meeting the description format or a state not meeting the description format is not changed due to conversion performed by the conversion module. The conversion signature can be said to be metadata indicating characteristics of the conversion module. Specifically, a conversion signature is represented as vector data including elements corresponding to the number of pieces of description format knowledge. Each of the elements of a conversion signature defined by a pair of an input attribute value and an output attribute value takes any one of "1" indicating that the input attribute value is changed into a state meeting the corresponding description format, "−1" indicating that the input attribute value is changed into a state not meeting the description format, and "0" indicating that a state meeting the description format or a state not meeting the description format does not changed. Note that when the input attribute value or output attribute value is changed, the elements are changed as well. When calculating the average of a conversion signature obtained after changing the input attribute value of the same conversion module, the elements may take values other than "1," "−1," and "0."

Figures 7, 8:
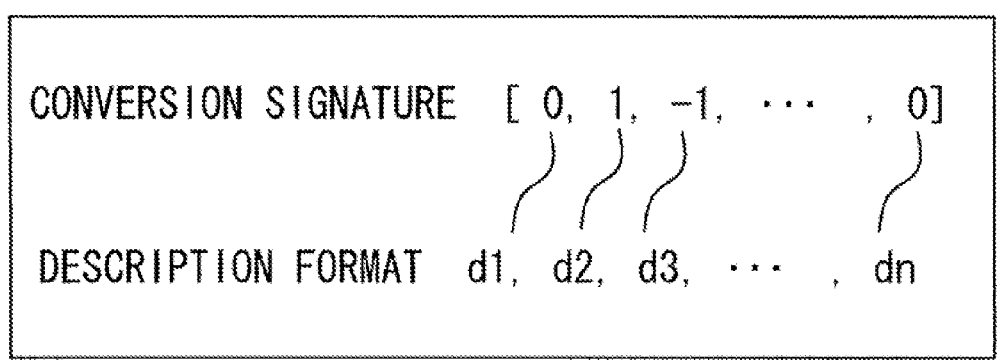
FIG. 7 is a drawing showing an example of a conversion signature.
FIG. 8 is a diagram showing an example of information stored in the example storage unit.

FIG. 7 is a drawing showing an example of a conversion signature. The conversion signature shown in FIG. 7 indicates that, due to a conversion performed by the conversion module, the attribute value has been changed into a state meeting a description format d2 and changed into a state not meeting a description format d3. The conversion signature also indicates that any of a state meeting (not meeting) a description format d1 and a state meeting (not meeting) a description format do has not been changed due to the conversion.

A single conversion signature is set for a pair of one input attribute and one output attribute. Accordingly, if a conversion signature has i number of input attributes and k number of output attributes, i×k number of conversion signatures are set for the conversion module. For example, in a case where "family name" and "first name" are inputs and these inputs are combined to output "full name," two conversion signatures, one about "family name" and "full name" and the other about "first name" and "full name," are set.

As described above, a conversion signature defined by a pair of an input attribute value and an output attribute value contains "1," "−1," and/or "0" as elements. For example, consider the above-mentioned conversion signature about "family name" and "full name." A conversion signature obtained from attribute values "Tanaka" and "Tarou Tanaka" contains "1," "−1," and/or "0" as elements. Similarly, a conversion signature obtained from attribute values "Sato" and "Jirou Sato" contains "1," "−1," and/or "0" as elements. However, the elements of these conversion signatures do not necessarily match each other completely, and when calculating the averages or the like of the conversion signatures, elements other than "1," "−1," and "0" may occur.

Among items to be stored in the conversion module storage unit 16, a module name, an input attribute, an input attribute type, an output attribute, an output attribute type, and execution definition information are prepared and stored in the conversion module storage unit 16 by the system manager or the creator of the conversion modules. When these items are stored, the conversion module execution means 17 automatically assigns a module ID to the items. Conversion signatures are generated by the conversion signature generation means 19.

The conversion module execution means 17 is called up by the conversion signature generation means 19 or conversion search means 12 and receives execution definition information about the conversion module and one or more attribute values. Subsequently, the conversion module execution means 17 executes the conversion module using the attribute values as input values, based on the execution definition information so as to generate post-conversion attribute values. Alternatively, the conversion module execution means 17 may cause another device to execute the conversion module and then may receive post-conversion attribute values from the device. For example, if information about a device storing the conversion module is contained in the execution definition information, the conversion module execution means 17 may send the attribute values to the device and cause the device to execute the conversion module. The conversion module execution means 17 passes the post-conversion attribute values on to the conversion signature generation means 19 or conversion search means 12, which is the caller.

In calling up a conversion module to convert attribute values, the conversion module execution means 17 performs conversions by referring to dictionaries, performing algebraic operations, performing character string operation processes, or performing a combination of these processes. In this case, the conversion module is previously stored, for example, in the conversion module storage unit 16. In order to refer to dictionaries during execution of the conversion module, the dictionaries are also previously stored in the conversion module storage unit 16.

Examples where a conversion is performed referring to a dictionary include one where "otoko" is converted into "male" and "onna" into "female." The conversion module execution means 17 refers to dictionaries according to the called-up conversion module and uses, as post-conversion attribute values, character strings such as a character string "male" corresponding to the attribute values such as "otoko." Examples of a character string operation process include a process of combining two character strings into one and a process of extracting a predetermined portion of an inputted character string and using the extracted portion as a post-conversion character string.

In cases such as one where n number of attribute values correspond to a single attribute value, the conversion module execution means 17 may perform conversions while combining dictionary reference and character string operation. For example, in using addresses as inputs and regions as outputs, it is a heavy burden to create a dictionary where individual addresses and regions correspond to each other. In this case, the conversion module execution means 17 may previously prepare a dictionary where prefecture names correspond to regions such as "Kinki," perform a character string operation process of extracting a prefecture name located at the top of an address, and then convert the prefecture name into the corresponding region using the dictionary.

For example, in inputting character strings described as "contact" and outputting personal names contained in the character strings, the conversion module execution means 17 may use a classifier created from a biographic dictionary. For example, the conversion module execution means 17 previously counts the number of times any two characters appear in the biographic dictionary and the number of times the two characters appear in a document that is previously prepared and is different from the biographic dictionary, so as to calculate the likelihood that the two characters may be a name. When reading a conversion module for converting "contact" into "personal name," the conversion module execution means 17 divides an inputted character string ("contact") into sets of two characters and extracts two characters considered to be likely to be a name. The above-mentioned example is one of examples where the conversion module execution means 17 performs conversions according to a conversion module. The aspect of a conversion process that the conversion module execution means 17 performs is not limited to a particular aspect.

The example storage unit 18 stores conversion execution examples generated by the conversion module execution means 17. FIG. 8 is a diagram showing an example of information stored in the example storage unit 18. An example ID, a conversion module ID, an input attribute value, and an output attribute value are stored for each conversion example. An example ID is the identifier for identifying a conversion example. A conversion module ID is the identifier of a conversion module used in the conversion example. An input attribute value a pre-conversion attribute value to be inputted into the conversion module. An output attribute value a post-conversion attribute value to be outputted by the conversion module. Conversion module IDs, input attribute values, and output attribute values are generated by the conversion module execution means 17. Also, sets of an conversion module ID, an input attribute value, and an output attribute value are manually stored in the example storage unit 18. When the creator or the like of a conversion module stores information about the conversion module in the conversion module storage unit 16, the conversion module creator or the like stores the conversion module ID of the conversion module, attribute values to be converted by the conversion module (input attribute values), and attribute values converted by the conversion module (output attribute values) in the example storage unit 18. When storing the conversion module ID, input attribute values, and output attribute values, the example storage unit 18 automatically assigns example IDs to these sets and stores the example IDs as well.

The conversion signature generation means 19 reads information (here, execution definition information) about the conversion module stored in the conversion module storage unit 16, causes the conversion module 17 to increase conversion examples using the conversion module, and stores the conversion examples in the example storage unit 18. Subsequently, the conversion signature generation means 19 causes the attribute value signature generation means 15 to generate attribute value signatures of the pre-conversion attribute values and post-conversion attributes, and generates conversion signatures from the attribute value signatures and stores the conversion signatures in the conversion module storage unit 16.

The conversion search means 12, attribute value signature generation means 15, conversion module execution means 17, and conversion signature generation means 19 are realized, for example, by a CPU that operates according to the conversion program search program. The attribute knowledge storage unit 13, description format knowledge storage unit 14, conversion module storage unit 16, and example storage unit 18 are realized, for example, by a storage device and the CPU that operates according to the conversion program search program. The CPU for realizing the means 12, 15, 17, and 19 and the CPU for realizing the means 13, 14, 16, and 18 described above may be the same CPU.

Next, the overall operation of this embodiment will be described. The operation of this embodiment is broadly divided into an operation for generating conversion signatures with respect to a conversion module and an operation for searching for a solution to a data connection problem.

Figure 9:
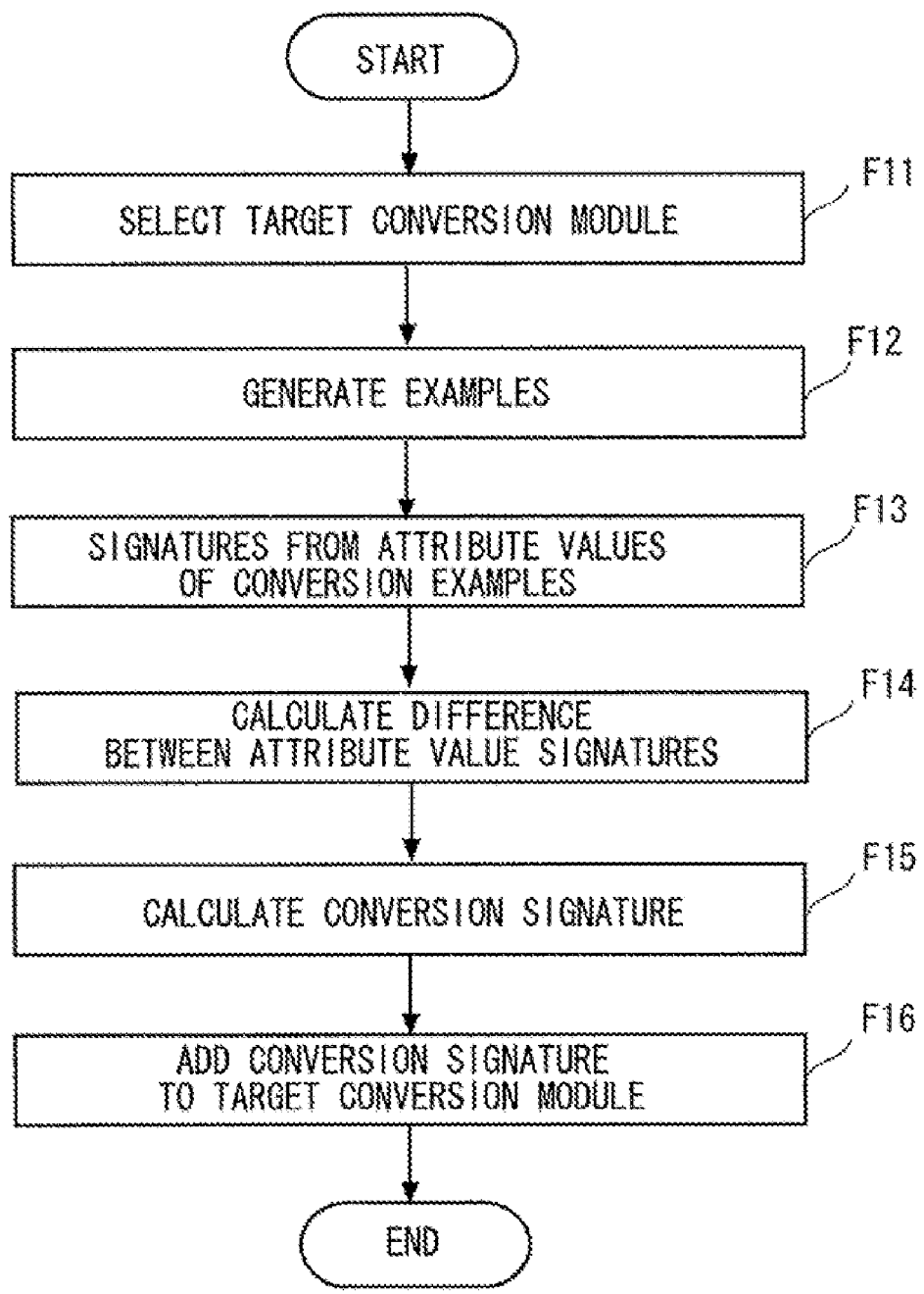
FIG. 9 is a flowchart showing an example of the operation for generating conversion signatures with respect to a conversion module.

FIG. 9 is a flowchart showing an example of the operation for generating conversion signatures with respect to a conversion module. First, the conversion signature generation means 19 identifies a piece of information about a conversion module with respect to which conversion signatures have yet to be generated, among pieces of information about conversion modules stored in the conversion module storage unit 16, and reads execution definition information about the module (step F11). Assuming that this execution definition information is execution definition information about a conversion module M1, an explanation will be provided. The conversion signature generation means 19 reads any attribute values from the example storage unit 18 and passes the attribute values as well as the execution definition information about the conversion module M1 on to the conversion module execution means 17. Then, the conversion signature creation means 19 causes the conversion module execution means 17 to perform the conversion module M1 using the passed attribute values as conversion-source attribute values and obtain post-conversion attribute values. The conversion signature generation means 19 considers the input values passed on to the conversion module execution means 17 as input attribute values and considers the post-conversion attribute values obtained by the conversion module execution means 17 as output attribute values, and stores the input attribute value and output attribute values in the example storage unit 18 in such a manner that these attribute values correspond to the ID of the conversion module Mi. The conversion signature generation means 19 repeats this process and increases the number of examples stored in the example storage unit 18 (step F12). In step F12, the attribute values that the conversion signature generation means 19 reads from the example storage unit 18 may be attribute values corresponding to a conversion module other than the conversion module M1 and may be any of input attribute values or output attribute values. Also, when the creator or the like of a conversion module stores information about the conversion module in the conversion module storage unit 16, the conversion module creator stores the conversion module ID of the conversion module, attribute values to be converted by the conversion module (input attribute value), and attribute values converted by the conversion module (output attribute values) in the example storage unit 18. Accordingly, when first proceeding to F12, attribute values can be read from the example storage unit 18.

Subsequently, the conversion signature generation means 19 reads all the conversion examples of the conversion module M1 (that is, the input attribute values and output attribute values corresponding to the conversion module M1) stored in the example storage unit 18. Then, the conversion signature generation means 19 specifies the read attribute values and causes the attribute value signature generation means 15 to generate an attribute value signature for each attribute value (step F13). When the attribute values are specified by the conversion signature generation means 19 in step F13, the attribute value signature generation means 15 determines whether each attribute value meets each of the description formats defined by the pieces of description format knowledge (see FIG. 5), in the form of 1 representing true and 0 representing false. Subsequently, the attribute value signature generation means 15 generates an attribute value signature by arranging 1 s and/or 0 s representing the determination results according to the conditional expressions in a predetermined order. Subsequently, the attribute value signature generation means 15 returns the attribute value signatures of the attribute values to the conversion signature generation means 19.

After step F13, the conversion signature generation means 19 calculates the difference between the attribute value signature of an output attribute value and the attribute value signature of an input attribute value with respect to each example data (a pair of an input attribute value and an output attribute value) so as to calculate a vector representing conversion characteristics for each example (step F14). Since both the attribute value signature of the output attribute value and the attribute value signature of the input attribute value are victors, the conversion signature generation means 19 may subtract the attribute value signature of the input attribute value from the attribute value signature of the output attribute value in step F12. This subtraction is a subtraction between the vectors.

Subsequently, the conversion signature generation means 19 organizes the vectors representing the conversion characteristics of the examples calculated in step F14 into a single vector (step F15). For example, in step F14, the average vector of the vectors representing the conversion characteristics of the examples may be obtained (that is, the average value may be obtained for each element). Alternatively, the median value may be calculated for each of elements of a vector representing conversion characteristics of each example. The calculation in step F15 described above is only illustrative and the vectors representing the conversion characteristics may be organized into a single vector by performing other calculations. The conversion signature generation means 19 stores the single vector organized in step F15, in the conversion module storage unit 16 as conversion signatures corresponding to the execution definition information read in step F11 (step F16). Through the above-mentioned process, a new conversion vector is generated and stored in the conversion module storage unit 16.

Figure 10:
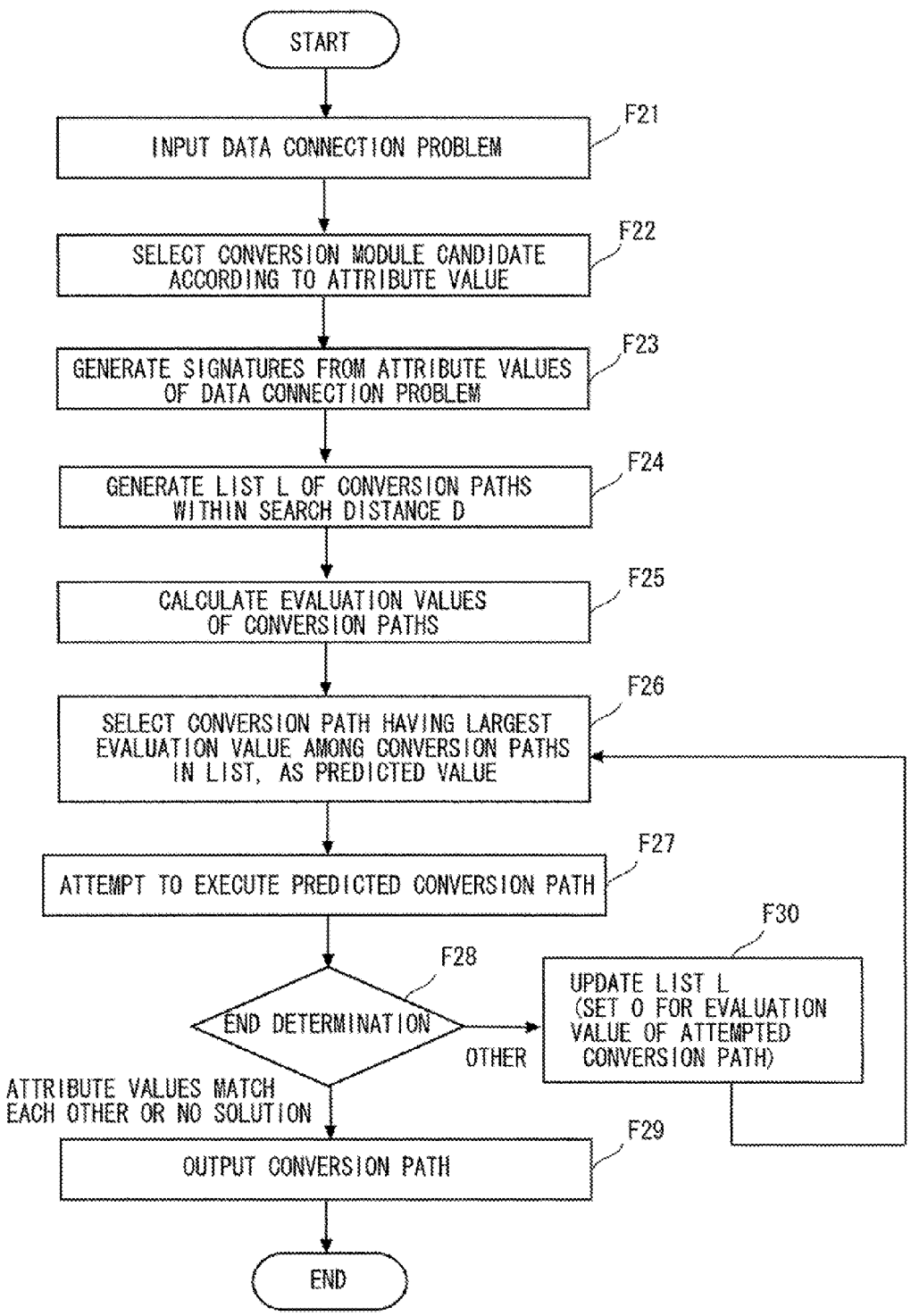
FIG. 10 is a flowchart showing an example of an operation for searching for a solution to a data connection problem.

Next, an operation for searching for a solution to a data connection problem will be described. FIG. 10 is a flowchart showing an example of an operation for searching for a solution (i.e., a conversion path) to a data connection problem. First, the data connection problem input and output unit 11 receives one or more conversion-source attribute names, one or more post-conversion attribute names, and a set of attribute value conversion examples (that is, a set of pairs of a conversion-source attribute value and a post-conversion attribute value) from an external system or user (step F21). The data connection problem input and output unit 11 passes the received pieces of data on to the conversion search means 12.

The conversion search means 12 selects candidates for conversion modules to be contained in a conversion path, according to the similarities between the attribute names (step F22). Hereafter, an example of step F22 will be shown. In step F22, the conversion search means 12 performs calculations according to the following Formulas (2) and (3) with respect to each conversion module. A conversion module to be subjected to the calculations according to Formulas (2) and (3) is represented by in. A set of the conversion-source attribute names received in step F21 is represented by s, and a set of the post-conversion attribute names received in step F21 is represented by t. A set of the attribute names of input attributes of the conversion module m is represented by in, and a set of the attribute names of output attributes of the conversion module m is represented by out. The conversion search means 12 may sequentially select the module IDs stored in the conversion module storage unit 16 one by one and consider a set of the attribute names of the input attributes corresponding to a selected module ID as in and a set of the attribute names of the output attributes corresponding to a selected module ID as out. A conversion module identified by a selected module ID is considered as in. The conversion search means 12 performs calculations according to the following Formulas (2) and (3) with respect to a conversion module m identified by a selected module ID.

$$InScore(m, s, t) = \max\left\{\frac{Sim(s_i, in_j)}{Sim(s_i, t_k)}; s_i \in s, in_j \in in, t_k \in t\right\} \quad \text{Formula (2)}$$

$$outScore(m, s, t) = \max\left\{\frac{Sim(t_i, out_j)}{Sim(s_k, t_i)}; s_k \in s, out_j \in in, t_i \in t\right\} \quad \text{Formula (3)}$$

In Formula (2), $s_i$ represents is any attribute name contained in a set s and $in_j$ represents any attribute name contained in a set in. $t_k$ is any attribute name contained in a set t. Sim (x, y) represents the similarity between terms (attribute names), x and y. max {calculation formula using a value in a set; the set} represents the largest of values obtained from a calculation formula using a value in a set. Accordingly, the conversion search means 12 causes the attribute knowledge storage unit 13 to calculate a similarity Sim ($s_i$, $in_j$) between $s_i$ and $in_j$ and a similarity Sim ($s_i$, $t_k$) between $s_i$ and $t_k$ for each of combinations of $s_i$, $in_j$, and $t_k$, and divides the Sim ($s_i$, $in_j$)

by the Sim ($s_i$, $t_k$). Then, the conversion search means 12 obtains the largest of the division results as InScore (m, s, t).

In Formula (3), $t_i$ represents any attribute name contained in the set t. $s_k$ represents any attribute name contained in the set s. $out_j$ represents any attribute name contained in a set out. The conversion search means 12 causes the attribute knowledge storage unit 13 to calculate a similarity Sim ($t_i$, $out_j$) between $t_i$ and $out_j$ and a similarity Sim ($s_k$, $t_i$) between $s_k$ and $t_i$ for each of combinations of $s_k$, $out_j$, and $t_i$, and divides the Sim ($t_i$, $out_j$) by the Sim ($s_k$, $t_i$). Then, the conversion search means 12 obtains the largest of the division results as OutScore (m, s, t).

If at least one of InScore and OutScore is larger than a predetermined threshold, the conversion search means 12 selects the conversion module m identified by the selected module ID as a candidate for a conversion module to be contained in the conversion path. The conversion search means 12 performs the above-mentioned process for each of the module IDs stored in the conversion module storage unit 16 (that is, for each conversion module) to determine whether each conversion module should be selected as a candidate for a conversion module to be contained in the conversion path. The above-mentioned process using Formulas (2) and (3) is only illustrative of step F22. The process of step F22 is not limited to the above-mentioned process. In other words, the conversion search means 12 may select conversion module candidates by other methods.

Also, the conversion search means 12 selects all conversion modules (e.g., character string connection conversion) with respect to which both input attributes and output attributes may be any attributes, as candidates for conversion modules to be contained in the conversion path.

After step F22, the conversion search means 12 specifies the attribute values (the pre-conversion attribute values and post-conversion attribute values contained in the set of attribute value conversion examples) received in step F21 and causes the attribute value signature creation means 15 to generate an attribute value signature (step F23). When receiving specification of the attribute values by the conversion search means 12, the attribute value signature generation means 15 generates an attribute value signature for each specified attribute value, as in step F13. Subsequently, the attribute value signature generation means 15 returns the attribute value signatures of the attribute values to the conversion search means 12.

Figure 11:
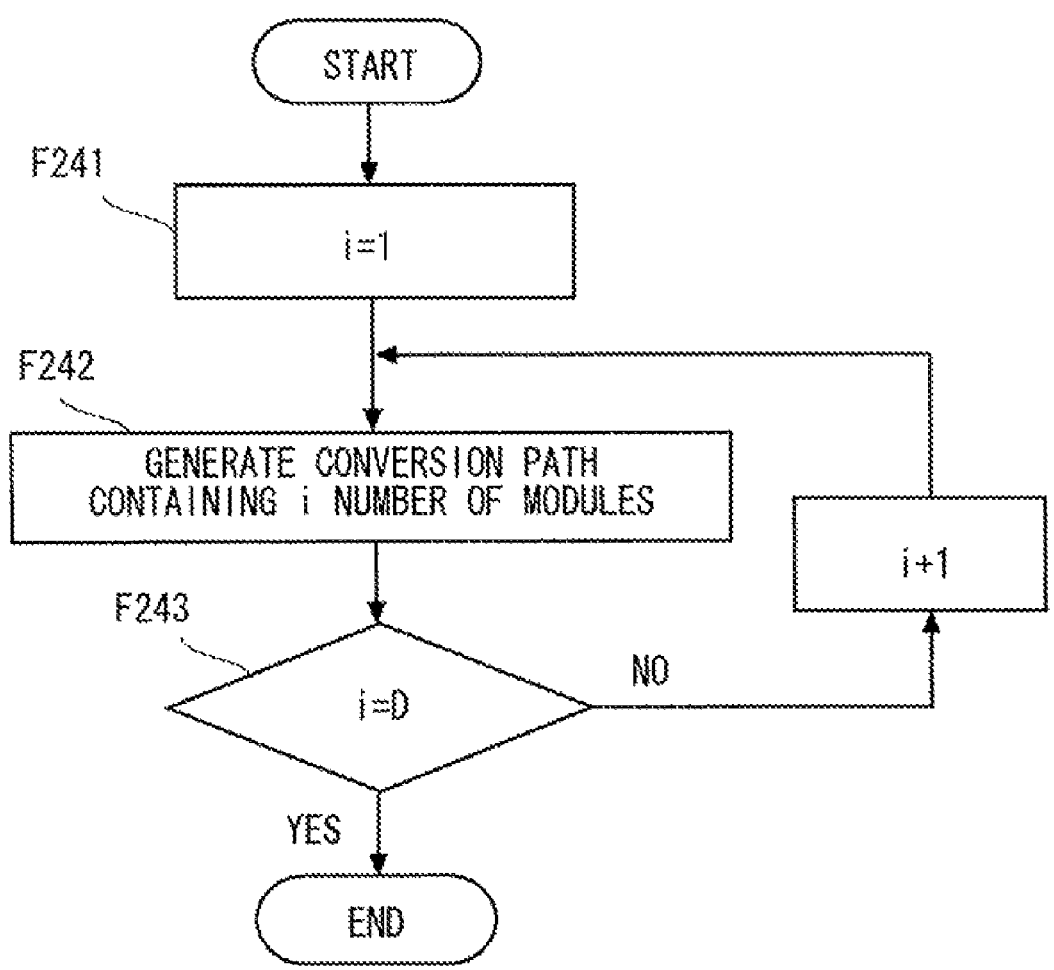
FIG. 11 is a flowchart showing an example of the progress of the process of step F24.

Next, the conversion search means 12 generates a list of conversion path candidates including conversion modules corresponding to numbers within the search distance D (step F24). As described above, the search distance D is the upper limit value of the number of conversion modules contained in the conversion path, which is a solution to the data connection problem. FIG. 11 is a flowchart showing an example of the progress of the process of step F24 where a list of conversion path candidates is created. In step F24, first, the conversion search means 12 sets 1 for the value of a variable i representing the number of conversion modules to be contained in a conversion path candidate (step F241).

After setting the value of the variable i, the conversion search means 12 generates a conversion path including the i number of conversion modules (step F242). After step F242, the conversion search means 12 determines whether i=D (step F243). In other words, the conversion search means 12 determines whether the value of the variable i matches the search distance D. If the variable i does not match the search distance D (no in step F243), the conversion search means 12 increments the value of the variable i by one (step F244) and repeats step F242 and later. If i=D in step 243, the conversion search means 12 ends step F24 (see FIG. 10), where a list of conversion path candidates is created, and proceeds to step F25. As seen, in step F24, the conversion search means 12 sequentially generates conversion paths from a conversion path including a single conversion module to a conversion path including the D number of conversion modules while incrementing the variable i.

The above-mentioned process of step F242 will be described in more detail. In step F242, the conversion search means 12 makes all combinations of conversion modules that can be made using the i number of conversion modules, from the list of conversion module candidates to be contained in the conversion path. The list of conversion module candidates to be contained in the conversion path refers to a list of the conversion modules selected in step F22 (see FIG. 10). The i number of conversion modules forming one combination may contain the same conversion modules. For example, if i=3, a combination of three same conversion modules may be contained in all combinations.

Next, for each of combinations of the i number of conversion modules, the conversion search means 12 connects between attributes, based on the i number of conversion modules, a set of conversion-source attribute names, and a set of post-conversion attribute names so as to generate and add multiple conversion paths. A "set of conversion-source attribute names" refers to the set of conversion-source attribute names received in step F21. This set of attribute names is represented by S. A "set of post-conversion attribute names" refers to the set of post-conversion attribute names received in step F21. This set of attribute names is represented by T. "Connect between attributes" refers to associating an attribute of a certain attribute name with an input attribute of a certain conversion module. For example, it refers to associating an attribute having a conversion-source attribute name with an input attribute of a first conversion module or associating an output attribute of each conversion module with an input attribute of the subsequent conversion module.

FIG. 12 is a diagram showing an example of the progress of a process of connecting between attributes. For example, FIG. 12A illustrates a case where a set of conversion-source attribute names includes s1 and s2, a set of post-conversion attribute names includes t1, and a combination of conversion modules includes m1, m2, and m3. If an input attribute i1 of the conversion module m1 and the conversion-source input attribute s1 in FIG. 12A are connected, the above-mentioned case is replaced with a case where a set of conversion-source attribute names includes output attributes o1 and s2 of the conversion module m1, a set of post-conversion attribute names includes the attribute name t1, and a combination of conversion modules includes the conversion modules m2 and m3, as shown in FIG. 12B. As seen, the process of connecting between attributes is realized by a recursive process.

FIG. 13 is a drawing showing an example of a process of connecting between attributes to generate a conversion path. A set of the i number of conversion modules contained in a combination to be subjected to a process of connecting between attributes is represented by M. A set of input attributes of a conversion module (represented by Mi) contained in the set M is represented by "in (Mi)" and a set of output attributes of the conversion module Mi is represented by "out (Mi)." A set of conversion-source attribute names is represented by S and a set of post-conversion attribute names is represented by T. The conversion search means 12 specifies S, T, and M and performs a process countUp (S, T, M). The conversion search means 12 defines the following three lists with respect to the process countUp (S, T, M). S, T, and M parenthesized after countUp represent specified sets.

A first list is a list storing the attribute names of unconnected attributes. Hereafter, this list will be referred to as an "unconnected input list UCSL" (or simply referred to as "UCSL"). A second list is a list storing the attribute names of unconnected conversion modules or post-conversion attribute names. Hereafter, this list will be referred to as an "unconnected output list UCTML" (or simply referred to as "UCTML"). A third list is a list storing information indicating the relationships between connected attributes. Hereafter, this list will be referred to as a "connection list CL" (or simply referred to as "CL"). The conversion search means 12 resisters the attribute names of connected attributes in the connection list CL as an attribute name pair, for example, in the form of "attribute name 1: attribute name 2." However, as for the attribute names of input attributes of a conversion module and/or the attribute names of output attributes thereof, the conversion search means 12 registers them along with the module name of the conversion module. As for the first conversion-source attribute name, the conversion search means 12 registers it along with information indicating that the attribute name represents a conversion-source attribute. As for the lastly obtained post-conversion attribute name, the conversion search means 12 registers it along with information indicating that the attribute name represents a post-conversion attribute.

In the process countUp (S, T, M), the conversion search means 12 registers the S in the UCSL. Also, the conversion search means 12 registers an aggregate of the T and M (that is, the set of post-conversion attribute names and the i number of conversion modules) in the UCTML. The conversion search means 12 places the connection list CL in an empty state (a state where nothing is registered). Subsequently, the conversion search means 12 specifies the UCSL, UCTML, and CL and performs a process "connect (UCSL, UCTML, CL)." UCSL, UCTML, and CL parenthesized after "connect" represent the specified lists.

In the process "connect (UCSL, UCTML, CL)," first, the conversion search means 12 checks whether UCSL and UCTML are placed in an empty state. If at least one of UCSL and UCTML is placed in an empty state, the conversion search means 12 ends the process "connect (UCSL, UCTML, CL)." However, if both UCSL and UCTML are placed in an empty state, the conversion search means 12 considers the specified connection list CL as a conversion path and adds the connection list CL to the list of conversion path candidates, and then ends the process "connect (UCSL, UCTML, CL)." As will be described later, the process "connect (UCSL, UCTML, CL)" will be performed in a recursive manner and the connection list CL to be specified at that time is a set of attribute name pairs. This CL represents a conversion path.

If none of the UCSL and UCTML is placed in an empty state, the conversion search means 12 extracts one element (represented by m) from the UCTML. The element m extracted from the UCTML may be a conversion module or may be an element of the set of post-conversion attribute names, T. In extracting the element m from the UCTML, the conversion search means 12 first extracts a conversion module as the element m. When there is no longer conversion module to extract, it extracts a post-conversion attribute name.

If the element m extracted from UCTML is a conversion module, the conversion search means 12 extracts, from UCSL, attribute names corresponding to a number |in(m)| of input attributes of m and makes all permutations P of the extracted attribute names. Here, P is a permutation. Accordingly, the conversion search means 12 extracts the |in(m)| number of attribute names in different orders and makes multiple Ps as different arrangements. Then, the conversion search means 12 performs the following process for each of the permutations P.

The conversion search means 12 creates a list TCL, which is a replica of CL. Next, the conversion search means 12 connects the attributes in each permutation P to the input attributes of m, sequentially from the top of the input attributes and adds the connected attributes to the TCL. Specifically, the conversion search means 12 connects the attribute names in each permutation P to the attribute names of the input attributes of m sequentially from the top of the input attributes and registers the connected attribute names in TCL.

Subsequently, the conversion search means 12 deletes the attribute names contained in the permutations P from the unconnected input list UCSL, as well as creates TUCSL, which is a list additionally including an output attribute out (m) of m. Also, the conversion search means 12 creates TUCTML, which is a list excluding m from the unconnected output list UCTML.

Since attribute names to be connected are registered in the TCL, it is sufficient to connect the attribute names contained in the TUCLS and the attribute names registered in the TUCTML or the input attributes of the conversion modules registered in the TUCTML. After creating the TCL, TUCSL, and TUCTML, the conversion search means 12 specifies the TUCSL, TUCTML, and TCL and performs a process connect (TUCSL, TUCTML, TCL). That is, the conversion search means 12 performs the process connect in a recursive manner.

If the element m extracted from the UCTML is an element contained in the set of post-conversion attribute names, T, the conversion search means 12 performs the following process for each of the attribute names (represented by p) contained in the UCSL.

As in the above-mentioned process, the conversion search means 12 creates a list TCL, which a replica of the CL. Next, the conversion search means 12 connects between the attribute names p contained in the UCSL and the element m and registers the connected p and m in the TCL.

Subsequently, the conversion search means 12 creates a TUCSL, which is a list excluding the p from the UCSL. Also, the conversion search means 12 generates a TUCTML, which is a list excluding the m from the unconnected output list UCTML.

As in the above-mentioned case, the conversion search means 12 specifies the TUCSL, TUCTML, and TCL and performs a process connect (TUCSL, TUCTML, TCL) in a recursive manner.

In step F242, the conversion search means 12 generates conversion path candidates by performing the process in a recursive manner as described above.

After generating all conversion path candidates (after step F24 shown in FIG. 10), the conversion search means 12 calculates the evaluation values of the conversion path candidates generated in step F24 (step F25). Here, a "single path," which is a term for explaining a method for calculating the evaluation values of the conversion paths, is defined. A "single path" refers to information indicating the relationship among one of conversion-source attribute values, one of post-conversion attribute values, input attribute of one or more conversion modules, and output attribute values of the one or more conversion modules. A single path is part of information indicated by a conversion path.

FIGS. 14A and 14B each show an example of single paths contained in a conversion path. In FIGS. 14A and 14B, attributes and conversion modules are shown, as in FIG. 2. FIGS. 14A shows four single paths, a1, a2, a3, and a4, contained in a conversion path a. FIG. 14B shows two single paths, b1 and b2, contained in a conversion path b. In examples shown in FIG. 14, the single paths are described using syntaxes described below. Specifically, one conversion-source attribute name, one or more conversion modules, and one post-conversion attribute name are described in the presented order from the left in such a manner that these items are each bracketed. In brackets representing a conversion module, the identifier of the conversion module, the attribute name of one input attribute of the conversion module, and the attribute name of one output attribute of the conversion module are described in the order of "conversion module identifier: attribute name of input attribute → attribute name of output attribute." For example, a single path b1 shown in FIG. 14B represents the following relationship. An attribute value of an attribute of an attribute name "s" is inputted into a conversion module m3 as an attribute value of an attribute of an attribute name "i11" and then outputted as an attribute value of an attribute of an attribute name "o11." The outputted attribute value is inputted into a conversion module m4 as an attribute value of an attribute of an attribute name "i21" and then outputted as an attribute value of an attribute of an attribute name "o22." The outputted attribute value is an attribute value of a post-conversion attribute (an attribute of an attribute name "t").

In step F25, the conversion search means 12 decomposes each conversion path candidate into single paths. For example, the conversion search means 12 may use, as a single path, a path from one conversion-source attribute name to one post-conversion attribute name, obtained by sequentially tracing an input attribute of a conversion module connected to a conversion-source attribute name and a post-conversion attribute name connected to an output attribute of the conversion module or an input attribute of the subsequent conversion module.

Then, the conversion search means 12 calculates the evaluation values of single paths obtained by decomposing one conversion path candidate. In calculating the evaluation value of one single path, the conversion search means 12 extracts an attribute value of an attribute having an attribute name described in the top of the single path, from the conversion-source attribute values received in step F21. Then, the conversion search means 12 causes the attribute value signature generation means 15 to generate an attribute value signature of the extracted attribute value. The attribute value signature of the conversion-source attribute value is represented by. Vs. Similarly, the conversion search means 12 extracts an attribute value of an attribute having an attribute name described at the end of the single path, from the post-conversion attribute values received in step F21. Then, the conversion search means 12 causes the attribute value signature generation means 15 to generate an attribute value signature of the extracted attribute value. The attribute value signature of the post-conversion attribute value is represented by Vt. The conversion search means 12 adds, to the Vs, the conversion signatures of the conversion modules contained in the single path and calculates the inner product of the addition result and the Vt, as the evaluation value of the single path. This calculation formula will be shown.

Assume that n number of conversion modules, M1, . . . , Mn, are described on a single path SPi. A conversion signature of the i-th conversion module among the number of conversion modules in the single path, corresponding to the input attribute and output attribute described in the single path is represented by TVi. If the evaluation value of this single path is represented by SPScore (Pi, Vs, Vt), the conversion search means 12 calculates the evaluation value SPScore (Pi, Vs, Vt) of the single path, according to Formula (4) shown below.

$$SPScore(Pi, Vs, Vt) = Vt \cdot \left( Vs + \sum_{i=1}^{n} TV_i \right) \quad \text{Formula (4)}$$

Heretofore, a case has been shown where the inner product of the attribute value signature Vt and vector data (represented by Va) obtained by adding, to the attribute value signature Vs, the conversion signatures of the conversion modules contained in the single path is used as the evaluation value of the single path. Alternatively, the cosine of an angle formed by the attribute value signature Vt and vector data Va may be used as the evaluation value. In this case, a value obtained by dividing the right side of Formula (4) by the product of the sizes of the vector data Vt and Va may be used as the evaluation value. A parenthesized portion of the right side of Formula (4) corresponds to the vector data Va.

The conversion search means 12 calculates the evaluation values of the single paths obtained by decomposing the one conversion path candidate, calculates the average value of the single paths or the median value (a numerical value located in the center when arranging numerical values in the descending order of the sizes thereof) of the single paths, and uses the calculated average value or median value as the evaluation value of the conversion path candidate. The conversion search means 12 predicts a conversion path candidate having the largest evaluation value from among the conversion path candidates, as a predicted conversion path to serve as a solution to the data connection problem (step F26).

After step F26, the conversion search means 12 causes the conversion module execution means 17 to try the selected conversion path. Specifically, the conversion search means 12 passes the conversion-source attribute values received in step F21 and execution definition information about the conversion modules contained in the predicted conversion path on to the conversion module execution means 17. Then, the conversion search means 12 causes the conversion module execution means 17 to execute the conversion modules in the order of the conversion paths, thereby obtaining the conversion results of the conversion-source attribute values (step F27).

Subsequently, the conversion search means 12 determines whether to end the search process (step F28). The conversion search means 12 compares the conversion results obtained in step F27 with the post-conversion attribute values (the post-conversion attribute values received in step F21) corresponding to the conversion-source attribute values. If these attribute values are completely matched, the conversion search means 12 considers the predicted conversion path as a solution to the data connection problem and outputs the data path from the data connection problem input and output unit 11 (step F29). If the evaluation value obtained in step F25 with respect to the predicted conversion path does not meet a predetermined threshold, the conversion search means 12 determines that there is no solution and ends the search.

If these attribute values are not completely matched and if the evaluation value is equal to or higher than the threshold, the conversion search means 12 updates the list of conversion path candidates obtained in step F24 (step F30). Specifically, the conversion search means 12 sets 0 for the evaluation value of the conversion path that has been tried in step F27 (that is, the predicted conversion path selected in the preceding step F26). After step F30, the conversion search means 12 moves to step F26 and repeats the processes of steps F26 and later. As seen, the conversion search means 12 sets 0 for the evaluation value of the conversion path temporarily selected in step F26 (step 30). Accordingly, in step F26 subsequent to step F30, the conversion search means 12 predicts, as a solution, a conversion path having the largest evaluation value among the conversion paths that have yet to be predicted as a solution to the data connection problem. As seen, in the loop process from steps F26 to F30, the conversion search means 12 selects and tries the conversion paths in the descending order of the evaluation values.

Next, a specific example of the operation will be described. FIG. 15 is a diagram showing an example of conversion modules whose information such as input attributes are stored in the conversion module storage unit 16. In order to show the functions of the conversion modules, the name, input attribute(s), output attribute, and conversion example of each conversion module are shown in FIG. 15. As for the input attributes and output attributes, the data type thereof is described together. "X" illustrated in FIG. 15 means that any attribute is applicable. The conversion examples show examples of attribute values converted by execution of the conversion modules. For example, "character string connection" shows an example where when "Tanaka" and "Tarou" are inputted, the two character strings are connected and converted into "Tarou Tanaka ." "One-character extraction" and "two-character extraction or the like" are conversion modules that extract the first one or two characters or the like of an inputted attribute value. Here, as shown in FIG. 15, it is assumed that information about various conversion modules such as a conversion module having multiple attributes as the input attribute or output attribute thereof, a conversion module that can be used to convert an attribute value of any attribute, or a conversion module that can be used with respect to only a specific attribute such as sex is stored in the conversion module storage unit 16. FIG. 15 is only illustrative of conversion modules, and conversion modules whose information such as an input attribute is stored in the conversion module storage unit 16 are not limited to the conversion modules illustrated in FIG. 15.

Also, it is assumed that the description format knowledge storage unit 14 stores at least the pieces of description format knowledge having the description format IDs "d0001," "d0002," "d0003," "d0011," and "d0012" illustrated in FIG. 5 and pieces of description format knowledge indicating conditions "described in three characters," "described in four characters," "described in five characters," and "described in six characters," which are similar to "d0012." The description format knowledge storage unit 14 may store other pieces of description format knowledge; however, in the following description, an explanation will be given showing only elements corresponding to these nine pieces of description format knowledge as elements of attribute value signatures and conversion value signatures.

First, an example of the conversion signature generation process illustrated in FIG. 9 will be described. Hereafter, an explanation will be given taking, as an example, a case where, with respect to "sex conversion A" illustrated in FIG. 15, the input attribute, input attribute type, output attribute, output attribute type, and execution definition information thereof are stored in the conversion module storage unit 16 but a conversion signature thereof is stored therein. When detecting "sex conversion A" as a conversion module whose conversion signature has yet to be stored, the conversion signature creation means 19 reads execution definition information about "sex conversion A" (step F11). Then, the conversion signature generation means 19 causes the conversion module execution means 17 to obtain a post-conversion attribute value using any attribute value stored in the example storage unit 18 as a conversion-source attribute value (step F12), and stores the example of the pre-conversion and post-conversion attribute values in the example storage unit 18. FIG. 16 shows examples generated with respect to "sex conversion A." The conversion signature generation means 19 deletes examples where the output (post-conversion attribute value) has been an "error" as shown in FIG. 16, from the example storage unit 18 and causes the attribute value signature generation means 15 to generate attribute value signatures with respect to the remaining examples (step F13).

FIG. 17 is an example of attribute value signatures generated by the attribute value signature generation means 15 with respect to the attribute values ("dansei," "male," "josei," and "female") of the examples shown in FIG. 16. Since "dansei" contains two kanji characters, it meets the conditions "kanji" and "two characters." Accordingly, the attribute value signature generation means 15 sets "1" for each of the elements corresponding to the conditions and sets "0" for each of the elements corresponding to the other conditions. Similarly, attribute value signatures are generated with respect to the other attribute values such as "male."

The conversion signature generation means 19 generates a conversion signature for each conversion example by performing a vector operation where the attribute value signature of the input attribute value is subtracted from the attribute value signature of the output attribute value, for each example. For example, the conversion signature generation means 19 performs a vector operation where the elements of the attribute value signature of "dansei" shown in FIG. 17 are subtracted from the elements of the attribute value signature of "male" shown in FIG. 17 and generates a conversion signature "−1, 0, 1, 0, −1, 0, 1, 0, 0" about the conversion from "dansei" to "male." Similarly, the conversion signature creation means 19 generates a conversion signature about the conversion from "josei" to "female" (step F14).

The conversion signature generation means 19 organizes the conversion signatures into one by calculating the average vector of the conversion signatures of the conversion examples (step F15). FIG. 18 shows an example of a conversion signature of "sex conversion A" generated in this way. This conversion signature indicates that the values described using two kanji characters are each converted into four alphabets or six alphabets. The conversion signature generation means 19 stores the conversion signature thus generated, in the conversion module storage unit 16.

Next, a specific example of an operation for searching for a conversion path to serve as a solution to a data connection problem will be described. In step F21, a data connection problem is inputted. Hereafter, an explanation will be given taking, as an example, a case where the conversion search means 12 receives "seibetsu" as a pre-conversion attribute name and "seibetsu" as a post-conversion attribute name and receives a pre-conversion attribute value "male" and a post-conversion attribute value "m" as an attribute value conversion example. After receiving the above-mentioned attribute names and attribute values in step F21, the conversion search means 12 selects conversion module candidates semantically related to the pre-conversion attribute name "seibetsu" and post-conversion attribute name "seibetsu" using the attribute knowledge storage unit 13 (step F22). Specifically, the conversion search means 12 selects candidates for conversion modules to be contained in a conversion path by performing calculations according to Formulas (2) and (3). At that time, the conversion search means 12 always selects conversion modules having no specific attribute names (conversion modules, such as "one-character extraction" shown in FIG. 15, where the input and output attributes are represented by "X") in step F22. FIG. 19 shows conversion module candidates that are selected through this process and related to seibetsu. As seen, in the selection based on the attribute name "seibetsu," conversion modules about character string operation or multiple conversion modules about sex are selected.

Next, the conversion search means 12 causes the attribute value signature generation means 15 to generate attribute value signatures with respect to the attribute values "dansei" and "m" received in step F21 (step F23).

Next, the conversion search means 12 generates conversion path candidates by combining the conversion modules selected in step F22 and calculates the evaluation values of the conversion path candidates (steps F24, F25). Hereafter, assuming that a conversion path {[seibetsu][sex conversion A][one-character extraction][seibetsu]} has been formed, a method for calculating the evaluation value of the conversion path will be described. The conversion search means 12 decomposes a conversion path, whose evaluation value is to be calculated, into single paths. However, this example is an example where one attribute is converted into one attribute, so a single path is the conversion path itself and the number of single paths is one.

FIG. 20 is a drawing showing an example calculation of the evaluation value of the conversion path. As described above, the evaluation value of the conversion path may be calculated as the inner product of the attribute value signature Vt and vector data Va, as shown by Formula (4). Alternatively, the cosine of an angle formed by the attribute value signature (vector data) Vt and vector data Va may be calculated as the evaluation value of the conversion path. Hereafter, an explanation will be given taking, as an example, a case where the cosine of an angle formed by the Vt and Va is calculated as the evaluation value of the conversion path.

In this example, vector data obtained by adding the conversion signature of "sex conversion A" ("−1, 0, 1, 0, −1, 0, 0.5, 0, 0.5") and the conversion signature of "one-character extraction" ("0, 0, 0, 1, 0, 0, 0, 0, 0") to the attribute value signature of the attribute value "dansei" ("1, 0, 0, 0, 1, 0, 0, 0, 0") is the Va. In this example, the Va is "0, 0, 1, 1, 0, 0, 0.5, 0, 0.5." The cosine of an angle formed by the vector data Va and "0, 0, 1, 1, 0, 0, 0, 0, 0," which is the conversion signature Vt of "m," is obtained as 0.894. This value is used as the evaluation value of the conversion path.

Similarly, the conversion search means 12 calculates the evaluation values of the other conversion paths and selects a conversion path having the highest evaluation value (step F26). Here, assume that {[seibetsu][sex conversion A][one-character extraction][seibetsu]} has the largest evaluation value. The conversion search means 12 causes the conversion module execution means 17 to sequentially obtain a post-conversion attribute value with respect to each of the conversion modules contained in the conversion path {[seibetsu][sex conversion A][one-character extraction][seibetsu]} using "dansei" as a conversion source (step F27). If the obtained attribute value is "m," the conversion search means 12 presents the conversion path {[seibetsu][sex conversion A][one-character extraction][seibetsu]} to the user or external system via the data connection problem input and output unit 11.

Next, advantages will be described. In the present invention, the conversion signature generation means 19 generates conversion signatures, which are pieces of metadata about conversion modules, based on the description format knowledge and stores the conversion signature of each conversion module in the conversion module storage unit 16. This allows generating pieces of metadata (conversion signatures) indicating characteristics of the conversion modules from a view point that the creator of each conversion module or the user of a certain application does not recognize and associating the generated pieces of metadata with the conversion modules. Also, if a human finds a new, different description format, he or she can add new metadata by storing new description format knowledge in the description format knowledge storage unit 14. In the present invention, a conversion path is predicted based on such metadata. This can increase the reusability of conversion modules.

In the present invention, conversion path candidates from a conversion path candidate including a single conversion module to a conversion path candidate including conversion modules corresponding to the search distance D are generated. This allows finding not only conversion paths using a single conversion module but also conversion paths corresponding to reusable forms where multiple conversion modules are combined. Accordingly, opportunities to reuse conversion modules can be increased.

For example, consider a case where an attribute value of an address, such as "xx xx Town, xx City, Nara Prefecture," is converted into an attribute value representing a region, such as "Kinki." Even if there is not a conversion module for directly converting an attribute value of "address" into an attribute value of "region," a conversion path that can convert an address into an region as described above can be obtained if there is a conversion module for converting an address into a prefecture name and a conversion module for converting a prefecture name into a region. Although the attribute value of a prefecture name such as "Nara Prefecture" and the attribute value such as "Kinki" are not superficially similar to each other, a conversion path where multiple conversion modules are combined can be obtained. This allows accurately finding a solution to a data connection problem.

In the present invention, the evaluation values of conversion paths are calculated in advance and whether desired attribute value conversion is performed using a conversion path having the largest evaluation value is determined. This can reduce the time required to perform an attribute value conversion process actually, allowing finding a solution to a data connection problem in a short time efficiently. For example, compare the present invention with the technology described in Non-Patent Document 1. In the technology described in Non-patent document 1, conversion modules are evaluated after conversions are performed. Accordingly, an attribute value conversion process must be actually performed with respect to each conversion module. On the other hand, the present invention can reduce the number of conversion modules that must convert an attribute value actually, allowing finding a solution to a data connection problem in a short time efficiently.

[Embodiment 2]

Figure 21:
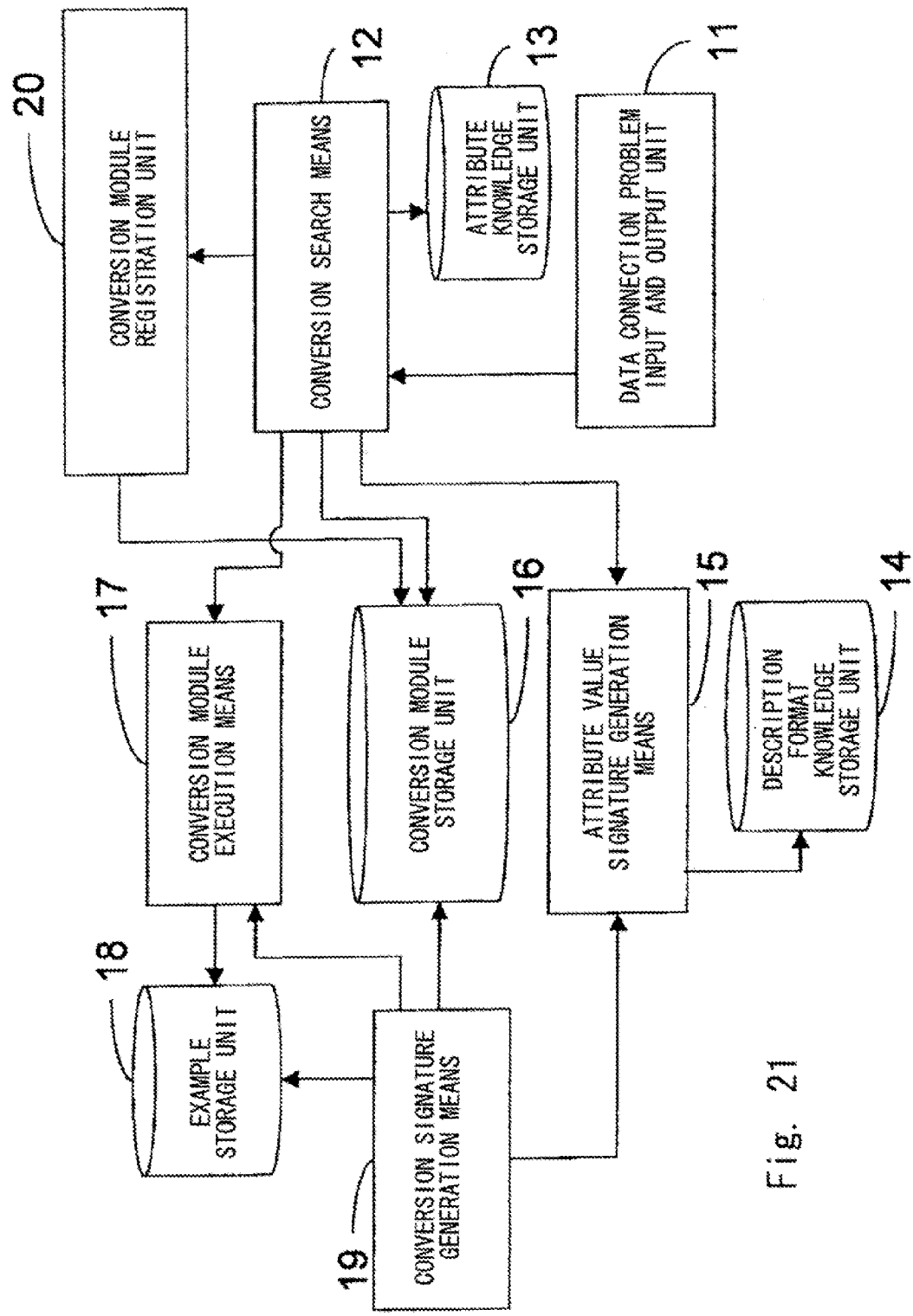
FIG. 21 is a block diagram showing a second embodiment of the present invention.

FIG. 21 is a block diagram showing a second embodiment of the conversion program search system according to the present invention. The same elements as those of the first embodiment are assigned the same reference numerals and will not be described. The conversion program search system of the second embodiment includes a data connection problem input and output unit 11, conversion search means 12, an attribute knowledge storage unit 13, a description format knowledge storage unit 14, attribute value signature generation means 15, a conversion module storage unit 16, conversion module execution means 17, an example storage unit 18, conversion signature generation means 19, and a conversion module registration unit 20. The operations of the elements other than the conversion module registration unit 20 are the same as those described in the first embodiment.

As in the first embodiment, the conversion search means 12 obtains a conversion path to serve as a solution to a data connection problem. A conversion path contains one or more sequenced conversion modules. In this embodiment, a combination of one or more sequenced conversion modules contained in a conversion module is considered as one new conversion module and information about the combination of the conversion modules is stored in the conversion module storage unit 16 as information about the one new conversion module. The conversion search means 12 passes the obtained conversion path on to the conversion module registration unit 20.

The conversion module registration unit 20 receives the conversion path found by the conversion search means 12 and registers the conversion path in the conversion module storage unit 16 as one conversion module. Specifically, when receiving the conversion path from the conversion search means 12, the conversion module registration unit 20 stores information about the combination of one or more sequenced conversion modules contained in the conversion path, in the conversion module storage unit 16 as information about one conversion module, as shown below.

The conversion module registration unit 20 stores the module names of the conversion modules contained in the conversion path, in the conversion module storage unit 16 as the module names of new conversion modules. For example, the conversion module registration unit 20 stores a character string where the module names of the conversion modules contained in the conversion path are hyphenated, in the conversion module storage unit 16 as the module name of the one new conversion module.

Also, the conversion module registration unit 20 stores the input attribute and the input attribute type of a conversion module to be executed first in the conversion path, in the conversion module storage unit 16 as the input attribute and the input attribute type of the one new conversion module.

Similarly, the conversion module registration unit 20 stores the output attribute and the output attribute type of a conversion module to be executed lastly in the conversion path, in the conversion module storage unit 16 as the output attribute and the output attribute type of the one new conversion module. If the output attribute of the conversion module to be executed lastly may be any attribute (for example, if the output attribute is "X" indicating that any attribute is applicable), the output attribute of a conversion module preceding the last conversion module may be stored as the output attribute of the new conversion module. If the preceding conversion module may be any output attribute, the output attribute of the further preceding conversion module may be stored.

Also, the conversion module registration unit 20 considers the conversion path itself as execution definition information about the one new conversion module and stores the conversion path in the conversion module storage unit. It is sufficient that information serving as execution definition information about the new conversion module is information that allows identifying the conversion modules contained in the conversion path in the order in which the conversion modules are executed. For example, information where the module IDs of the conversion modules contained in the conversion path are arranged in the order in which the conversion modules are executed may be used as execution definition information.

Also, the conversion module registration unit 20 stores, in the example storage unit 18, attribute value conversion examples inputted when a data connection problem having the conversion path as a solution is inputted.

The conversion signature generation means 19 generates conversion signatures with respect to the conversion path, whose information such as the input attribute, output attribute, and execution definition information is stored in the conversion module storage unit 16, and stores the conversion signatures in the conversion module storage unit 16.

If the number of conversion modules contained in the conversion path is one, the conversion module registration unit 20 does not need to newly register information about the conversion module contained in the conversion path.

In obtaining the result of a conversion performed by the conversion modules considered as one, the conversion module execution means 17 may sequentially refer to pieces of execution definition information identified by the conversion modules contained in the execution definition information about the conversion module to sequentially obtain the results of conversions performed by the conversion modules.

The conversion module registration unit 20 is realized, for example, by a CPU that operates according to the conversion program search program. This CPU may be identical to a CPU for realizing other elements (conversion search means 12 and the like).

A specific example of the operation of the conversion module registration unit 20 will be described. FIG. 22 is a diagram showing an example of information about a new module registered in the conversion module storage unit 16 by the conversion module registration unit 20. It is assumed that the conversion module storage unit 16 stores a conversion module that has a module ID "m0001," a module name "sex conversion A," an input attribute {[seibetsu]}, an input attribute type {[String]}, an output attribute {[seibetsu]}, and an output attribute type {[String]} and whose execution definition information is defined. Similarly, it is assumed that the conversion module storage unit 16 stores a conversion module that has a module ID "m0002," a module name "one-character extraction," an input attribute {[X]}, an input attribute type {[String]}, an output attribute {[seibetsu]}, and an output attribute type {[String]} and whose execution definition information is defined. Also, it is assumed that the conversion search means 12 has obtained a conversion path including the two conversion modules in the order of "sex conversion A" and "one character extraction" and passed the conversion path on to the conversion module registration unit 20.

The conversion module registration unit 20 stores "sex conversion A-one-character extraction" obtained by hyphenating the module names "sex conversion A" and "one-character extraction" in the order in which the module names are contained in the conversion path, in the conversion module storage unit 16 as the module name of a new conversion module. Also, the input attribute {[seibetsu]} and the input attribute type {[String]} of the first conversion module are stored as the input attribute and input attribute type of the new conversion module. Also, the output attribute and output attribute type of the last conversion module are stored in the conversion module storage unit 16 as the output attribute and output attribute type of the new conversion module. In this example, the output attribute is "X" indicating that any attribute is applicable to "X," so the output attribute {[seibetsu]} of the conversion module (sex conversion A) preceding the last conversion module is stored as the output attribute. Also, in this example, the conversion module registration unit 20 stores {[m0001], [m0002]} where the module IDs of the conversion modules contained in the conversion path are arranged in the order in which the conversion modules are executed, in the conversion module storage unit 16 as execution definition information.

In obtaining the result of a conversion performed by this new conversion modules considered as one, the conversion module execution means 17 may sequentially obtain the result of a conversion performed by "sex conversion A" and the result of a conversion performed by "one-character extraction" while referring to execution definition information identified by [m0001] and execution definition information identified by [m0002].

Next, advantages of this embodiment will be described. In this embodiment, the conversion module registration unit 20 considers the conversion paths found by the conversion search means 12 as a single conversion module and registers the information about the single conversion path in the conversion module storage unit 16. Even when there are different data connection problems, the same conversion module combination can be often used as solutions to the data connection problems. Accordingly, time and effort to search for conversion modules again can be saved by storing a combination of conversion modules that have appeared in the past, as in this embodiment. As a result, a data connection problem can be solved more quickly.

Also, the combination of conversion modules is considered as a single conversion module and information about the conversion modules considered as a single is stored in the conversion module storage unit 16. This eliminates the need to generate new conversion modules having the same functions as those of a conversion path. As a result, the burden of managing conversion modules is reduced. For example, the manager can easily recognize combinations of conversion modules that have appeared in the past, by referring to information stored in the conversion module storage unit 16. As a result, the manager can determine that there is no need to generate new conversion modules. Also, since the number of conversion modules to be generated is reduced, the work burden of registering information about conversion modules in the conversion module storage unit 16 is reduced as well.

[Embodiment 3]

Figure 23:
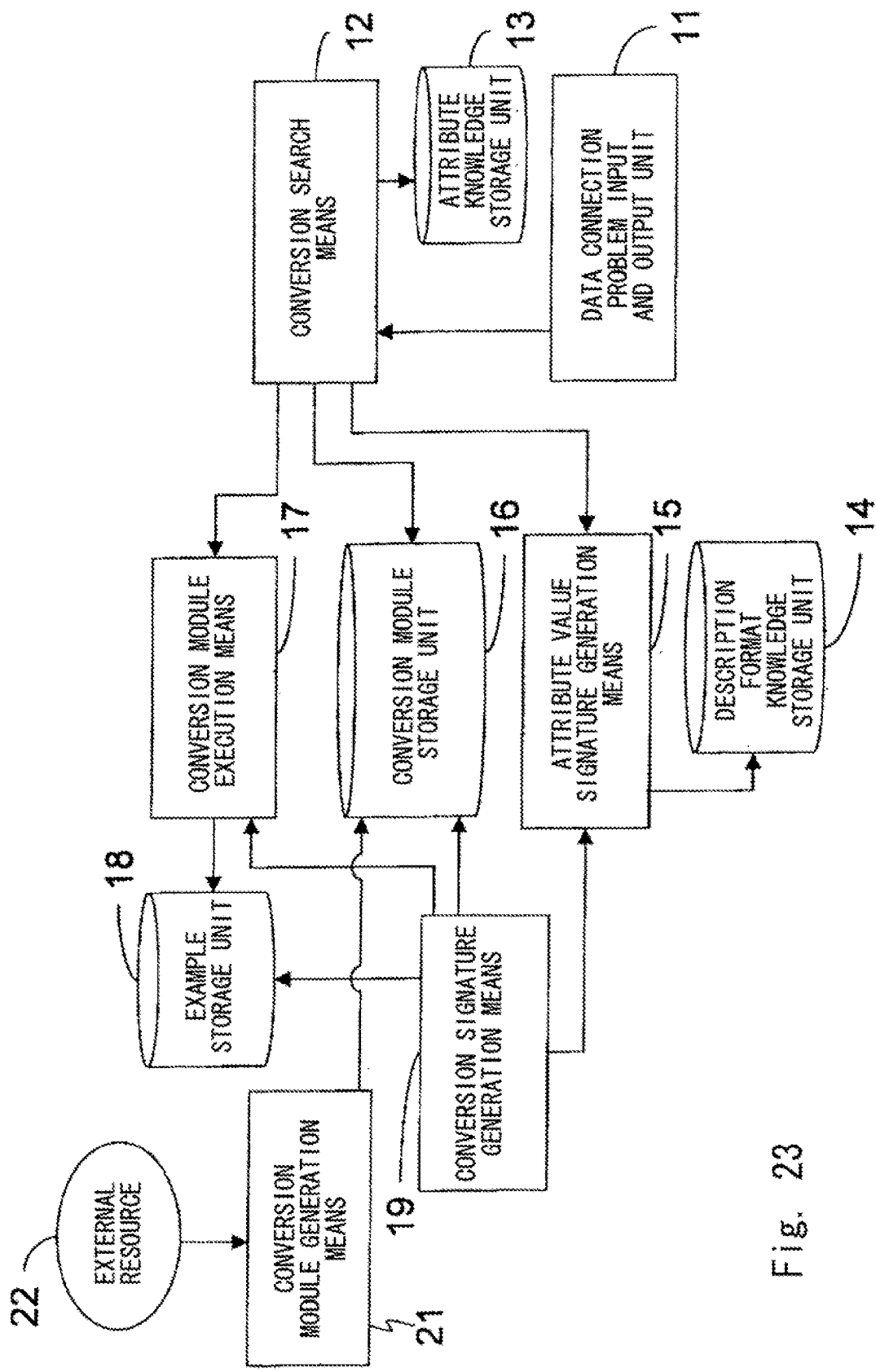
FIG. 23 is a block diagram showing a third embodiment of the present invention.

FIG. 23 is a block diagram showing a third embodiment of the conversion program search system according to the present invention. The same elements as those of the first embodiment are assigned the same reference numerals and will not be described. The conversion program search system of the third embodiment includes a data connection problem input and output unit 11, conversion search means 12, an attribute knowledge storage unit 13, a description format knowledge storage unit 14, attribute value signature generation means 15, a conversion module storage unit 16, conversion module execution means 17, an example storage unit 18, conversion signature generation means 19, and a conversion module generation unit 21. The operations of the elements other than the conversion module generation unit 21 are the same as those described in the first embodiment.

However, in this embodiment, for example, if a set of dictionary rules is specified and an attribute value serving as input data is defined, the conversion module storage unit selects an attribute value corresponding to the attribute value serving as input data, from the set of dictionary rules and previously stores a program (hereafter referred to as a "dictionary program") using the corresponding attribute value as output data. A "dictionary rule" refers to information where an attribute value serving as input data and an attribute value to serve as output data correspond to each other. The attribute value serving as input data is a conversion-source attribute value and is information corresponding to the attribute value to serve as output data. If an attribute value corresponding to the attribute value serving as input data has yet to be defined when the conversion module execution means 17 executes the dictionary program, an error will be returned.

An external resource 22 (see FIG. 23) is table-structure data having at least one primary key. A primary key is an attribute name with respect to which it is guaranteed that all attribute values thereof are unique (that is, attribute values do not overlap each other), among attribute names defined in a table. For example, information where attribute names "employee number," "namae," and "address" are defined and that contains a set of combinations of an attribute value of "employee number," an attribute value of "namae," and an attribute value of "address" may be used as the external resource 22. In this example, "employee number" is a primary key. Also, for example, a database or ontology previously generated in a company or the like may be used as the external resource 22.

The conversion module creation means 21 reads the external resource 22 to make a dictionary rule. Then, the conversion module creation means 21 generates a combination of the dictionary rule and dictionary program as a new conversion module.

Figure 24:
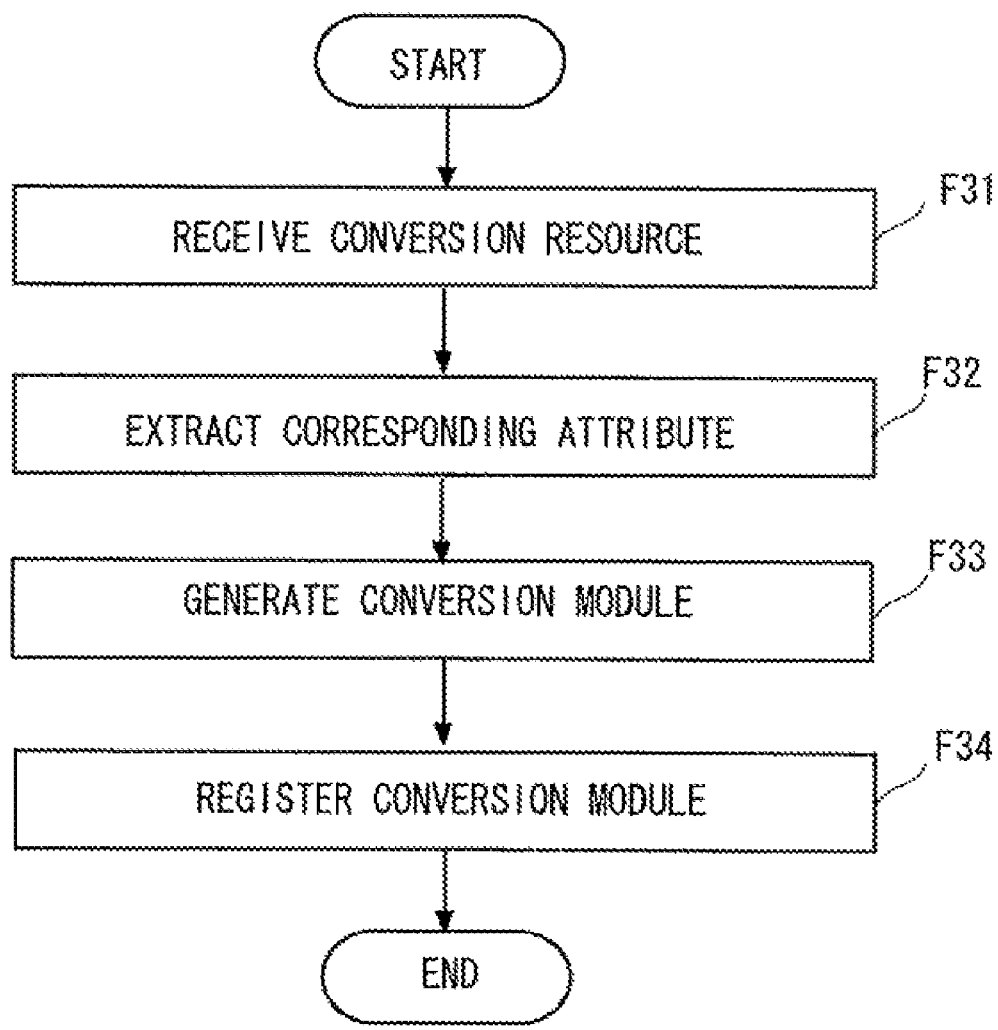
FIG. 24 is a flowchart showing an example of the operation of the conversion module creation means.

FIG. 24 is a flowchart showing an example of the operation of the conversion module creation means 21. The conversion module creation means 21 is activated when receiving the external resource 22. Upon receiving the external resource 22 (step F31), the conversion module generation means 21 extracts corresponding attribute names from the external resource 22 (step F32). The corresponding attribute names refer to attribute names whose attribute values correspond to each other in the external resource 22. Specifically, the conversion module generation means 21 may extract an attribute name serving as a primary key and any another attribute name in step F32. For example, if the external resource 22 is a database, the conversion module generation means 21 may extract a combination of a field serving as a primary key and another field.

Subsequently, the conversion module generation means 21 generates a new conversion module (step F33). In step F33, the conversion module generation means 21 extracts pairs of attribute values of corresponding attribute names in the order of records of the table and stores a set of the extracted attribute value pairs in the conversion module storage unit 16 as a dictionary rule. At that time, the conversion module generation means 21 stores the attribute value pairs in the conversion module storage unit 16 while using the attribute values of the primary key as input (conversion source) attribute values and using the attribute values of the another attribute name as output attribute values (post-conversion attribute values). After extracting attribute value pairs from all records and storing the extracted attribute value pairs as a dictionary rule, the conversion module generation means 21 defines a set of the dictionary rule and the dictionary program as a new conversion module. At that time, the conversion module generation means 21 may generate a template of an SQL statement for extracting attribute values from the dictionary rule and incorporate the generated template into the conversion module.

After step F33, the conversion module generation means 21 stores the module name, input attribute, input attribute type, output attribute, output attribute type, and execution definition information of the new conversion module in the conversion module storage unit 16 as information about the new conversion module, as shown in FIG. 6 (step F34). The module name may be a character string where the name provided to the external resource 22 and the attribute names of the input attribute and output attribute are connected. The module name may be determined in other ways. Also, information for specifying the dictionary rule stored in the conversion module storage unit 16 in step 33 and executing the dictionary program may be used as the execution definition information. The execution definition information may be information for executing the dictionary program combined with the dictionary rule. The conversion module generation means 21 may store the attribute name serving as a primary key and the attribute type of the attribute values of the attribute name as the input attribute and input attribute type. Similarly, the conversion module generation means 21 may store the attribute name paired with the primary key and the attribute type of the attribute values of the attribute name as the output attribute and output attribute type. In step F34, the conversion module generation means 21 stores the attribute value pairs (pairs of a conversion-source attribute value and a post-conversion attribute value) extracted from the external resource 22 and considered as a dictionary rule, in the example storage unit 18 as attribute value conversion examples. The number of attribute value pairs to be stored in the example storage unit 18 is not limited to a particular number.

If there are multiple attribute names other the primary key in the external resource 22, the conversion module generation means 21 may perform the processes of steps F32 to F34 with respect to the pairs of the primary key and each of the other attribute names.

The conversion signature generation means 19 generates conversion signatures with respect to the new conversion program, whose information such as the input attribute, output attribute, and execution definition information is stored in the conversion module storage unit 16, and stores the conversion signatures in the conversion module storage unit 16.

The conversion module generation means 21 is realized, for example, by a CPU that operates according to the conversion program search program. This CPU may be the same as a CPU for realizing other elements (conversion search means 12 and the like).

Next, a specific example of the operation of the conversion module generation means 21 will be described. Hereafter, a case where the external resource 22 is a table about employees in a relational database (hereafter referred to as a "RD.B") and where there is a field "employee number (primary key), name, address" in the table will be used as an example. When receiving the external resource 22 as described above (step F31), the conversion module generation means 21 extracts a pair of the attribute name "employee number," which is a primary key, and the attribute name "namae" from the external resource 22 (step F32).

Next, the conversion module generation means 21 extracts all pairs of an attribute value of "employee number" and an attribute value of "namae" in the order of records and stores a set of the extracted attribute value pairs in the conversion module storage unit 16 as a dictionary rule. Then, the conversion module generation means 21 applies the attribute name or dictionary rule name to "attribute names other than primary key," "dictionary rule name," and "attribute name of primary key" in an SQL statement "select attribute names other than primary key from dictionary rule name where attribute name of primary key=?" to create a template of the SQL statement. For example, assuming that "dictionary rule name" is an employee table, the conversion module generation means 21 generates an SQL statement "select name from employee table where employee number=?." By substituting an attribute value, which is input data, into "?" of the template and executing the SQL statement, a post-conversion attribute value is extracted from the dictionary rule. Also, in this embodiment, it is assumed that a program for calling up a template of an SQL statement and substituting an attribute value, which is input data, into "?" of the template to execute the SQL statement is previously stored in the conversion module storage unit 16 as a dictionary program. The conversion module generation means 21 defines a combination of the dictionary program, the generated SQL statement template, and dictionary rule as a new conversion module (step F33).

Also, the conversion module generation means 21 stores the module name, input attribute, input attribute value, output attribute, output attribute value, and execution definition information of the conversion program in the conversion module storage unit 16 and stores the dictionary rule in the example storage unit 18 (step F34).

While the case where steps F32 to F34 are performed with respect to the pairs of "employee number" and "namae" has heretofore been described, the conversion module generation means 21 may also perform the processes of steps F32 to F34 with respect to "employee number" and "address."

In this embodiment, the conversion module generation means 21 defines a new conversion module, based on the external resource 22. Accordingly, by receiving the external resource 22, some of conversion modules can be automatically generated. This can reduce work costs caused when applying the present invention to applications.

Also, the conversion program search system according to this embodiment may include a conversion module registration unit 20 that operates as in the second embodiment. In this case, advantages similar to those of the second embodiment can be obtained.

[Embodiment 4]

Figure 25:
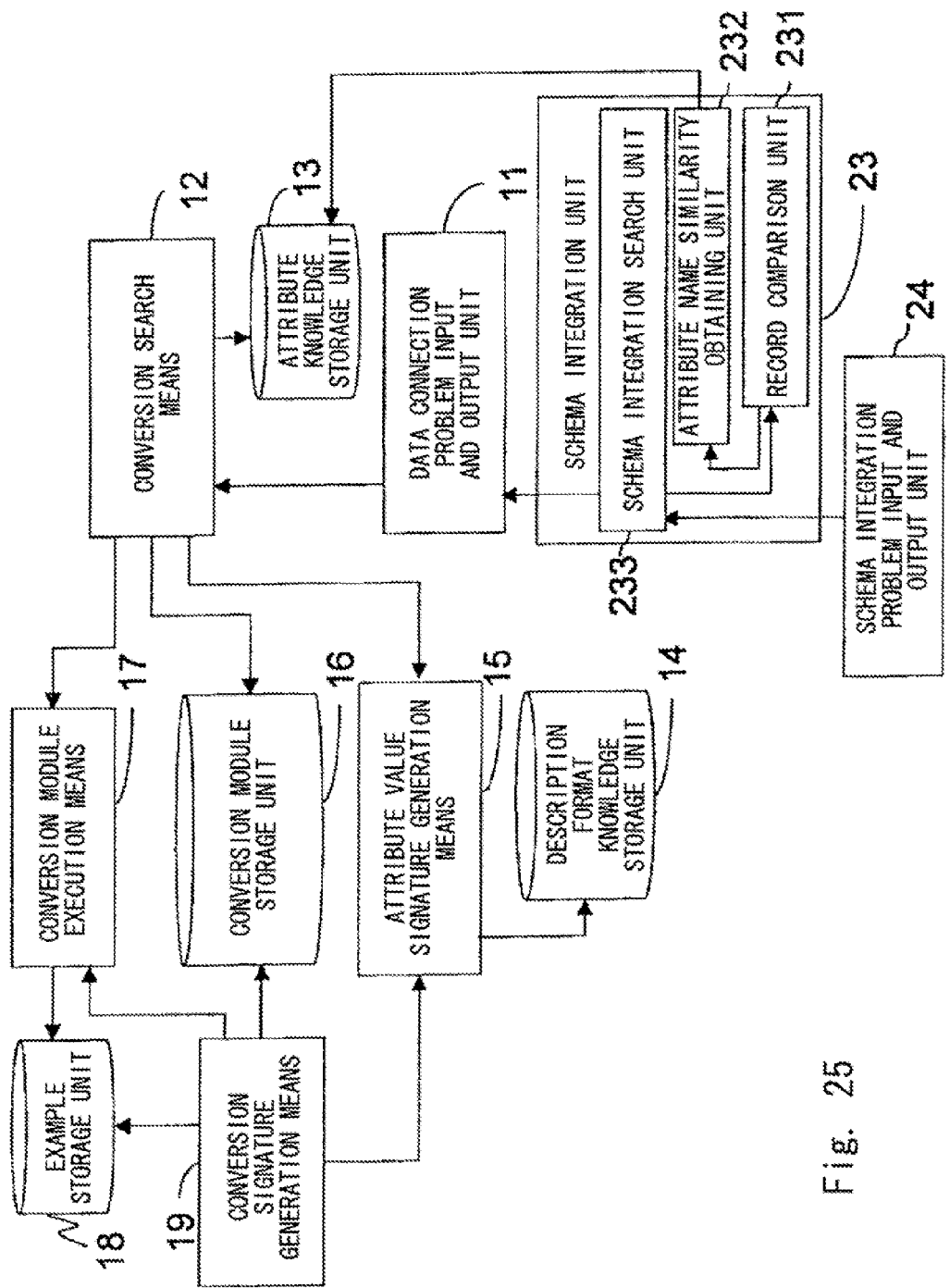
FIG. 25 is a block diagram showing a fourth embodiment of the present invention.

FIG. 25 is a block diagram showing a fourth embodiment of the conversion program search system according to the present invention. The same elements as those of the first embodiment are assigned the same reference numerals and will not be described. The conversion program search system of the fourth embodiment includes a data connection problem input and output unit 11, conversion search means 12, an attribute knowledge storage unit 13, a description format knowledge storage unit 14, attribute value signature generation means 15, a conversion module storage unit 16, conversion module execution means 17, an example storage unit 18, conversion signature generation means 19, a schema integration unit 23, and a schema integration problem input and output unit 24.

The schema integration problem input and output unit 24 receives a schema integration problem consisting of two schemas and records thereof and outputs a solution to the schema integration problem. The two schemas refer to a conversion-source schema and a post-conversion schema. The records refer to data representing an object or event of the real world using a set of attribute names defined by the schemas. For example, assume that one schema for defining a "human" contains four attributes having attribute names "namae," "address," "seibetsu," and "age." In this case, a set of four attribute values "Tarou Tanaka," " . . . . Nara City, Nara Prefecture," "otoko," and "28 years old" constitutes one record. That is, a record is a combination of attribute values of the attributes defined by the schema. A schema integration problem is defined by a conversion-source schema, a set of pieces of data prepared by the conversion-source schema (a set of records of the conversion-source schema), a post-conversion schema, and a set of pieces of data prepared by the post-conversion schema (a set of records of the post-conversion schema). Accordingly, the schema integration problem input and output unit 24 receives a pre-conversion schema, a set of records thereof, a post-conversion schema, and a set of records thereof, as a schema integration problem. A solution to a schema integration problem refers to information indicating a conversion method for representing data represented by a conversion-source, using a post-conversion schema and includes information indicating the correspondences between the attribute names of the conversion-source schema and the attribute names of the post-conversion schema and a conversion path for converting attribute values of pre-conversion attribute names into attribute values of corresponding post-conversion attribute names. The schema integration problem input and output unit 24 outputs, as a solution of the schema integration problem, the information indicating the correspondences between the attribute names of the conversion-source schema and the attribute names of the post-conversion schema and the conversion path for converting attribute values.

The schema integration problem input and output unit 24 is operated, for example, by an external system or a user. The schema integration problem input and output unit 24 is realized, for example, by an input device such as a keyboard and an output device such as a display device. Alternatively, the schema integration problem input and output unit 24 may be an input interface with an external system. In this embodiment, the data connection problem input and output unit 11 is an interface between the schema integration unit 23 and conversion search means 12. As will be described later, the schema integration unit 23 is realized by a CPU that operates according to the program. However, if the CPU for realizing the schema integration unit 23 is identical to a CPU for realizing other elements (conversion search means 12 and the like), the data connection problem input and output unit 11 does not always need to be provided in the form of a circuit serving as an interface between the schema integration unit 23 and conversion search means 12.

The schema integration unit 23 finds the correspondences between the attribute names of the pre-conversion schema and those of the post-conversion schema and the correspondences between the records. Then, the schema integration unit 23 inputs, as a data connection problem, the attribute names of the conversion-source schema, the attribute names of the post-conversion schema, and attribute values of the attributes having these attribute names into the conversion search means 12 via the data connection problem input and output unit 11. When a conversion path to serve as a solution to the data connection problem is outputted, the schema integration unit 23 outputs the attribute names of the pre-conversion schema, the attribute names of the post-conversion schema, and the conversion path via the schema integration problem input and output unit 24.

The schema integration unit 23 includes a schema integration search unit 233, an attribute name similarity obtaining unit 232, and a record comparison unit 231.

The attribute name similarity obtaining unit 232 receives two attribute names as input data and obtains the similarity between the two attribute names. In obtaining this similarity, the attribute name similarity obtaining unit 232 uses the attribute knowledge storage unit 13. Alternatively, the attribute value similarity that the attribute name similarity obtaining unit 232 obtains may be a result obtained by performing an additional operation on a similarity obtained by the attribute storage unit 13.

The record comparison unit 231 generates all pairs of an attribute name of the conversion-source schema and an attribute name of the post-conversion schema and causes the attribute name similarity obtaining unit 232 to obtain an attribute name similarity for each pair. Then, the record comparison unit 231 refers to the attribute name similarities to identify corresponding pre-conversion and post-conversion attribute names, corresponding records between the pre-conversion schema and post-conversion schema, and corresponding attribute values between the records of the conversion-source schema and those of the post-conversion schema. For example, the record comparison unit 231 performs a process of associating an attribute name "telephone" of the pre-conversion schema with an attribute name "Tel" of the post-conversion schema. Also, the record comparison unit 231 identifies a pre-conversion record "dansei, 0774xxxx, ..." including sex and a telephone number and a post-conversion record "m, 0774xxxx," as corresponding records and perfbrms a process of identifying the corresponding attribute values "dansei" and "M," corresponding attribute values "0774xxxx" and "0774xxxx," and the like between these records.

When receiving the schema integration problem (the conversion-source schema and the set of records thereof and the post-conversion schema and the set of records thereof) from schema integration problem input and output unit 24, the schema integration search unit 233 passes the schema integration problem on to the record comparison unit 231 and receives information indicating the correspondences between the attribute names as well as pairs of corresponding attribute values among the attribute values of the corresponding conversion-source and post-conversion attribute names, from the schema integration search unit 233.

Also, the schema integration search unit 233 refers to the corresponding attribute names between the schemas and the corresponding pieces of data (attribute values) identified by the record comparison unit 231 to determine whether to obtain a solution to the data connection problem. For example, if corresponding attribute names have the same attribute name or corresponding attribute values have the same attribute name, the schema integration search unit 233 does not need to obtain a solution to the data connection problem. If corresponding attribute names are different attribute names or corresponding attribute values are different attribute values, the schema integration search unit 233 determines that there is a need to obtain a solution to the data connection problem. If there is a need to obtain a solution to a data connection problem, the schema integration search unit 233 inputs the corresponding attribute names and attribute values of attributes having the attribute names into the data connection problem input and output unit 11 as a data connection problem and obtains a solution thereto. The schema integration search unit 233 outputs the pairs of corresponding attribute names and conversion paths related to the pairs and outputs in units of corresponding attribute name pairs via the schema integration problem input and output unit 24. The outputted data is a solution to the schema integration problem.

Figure 26:
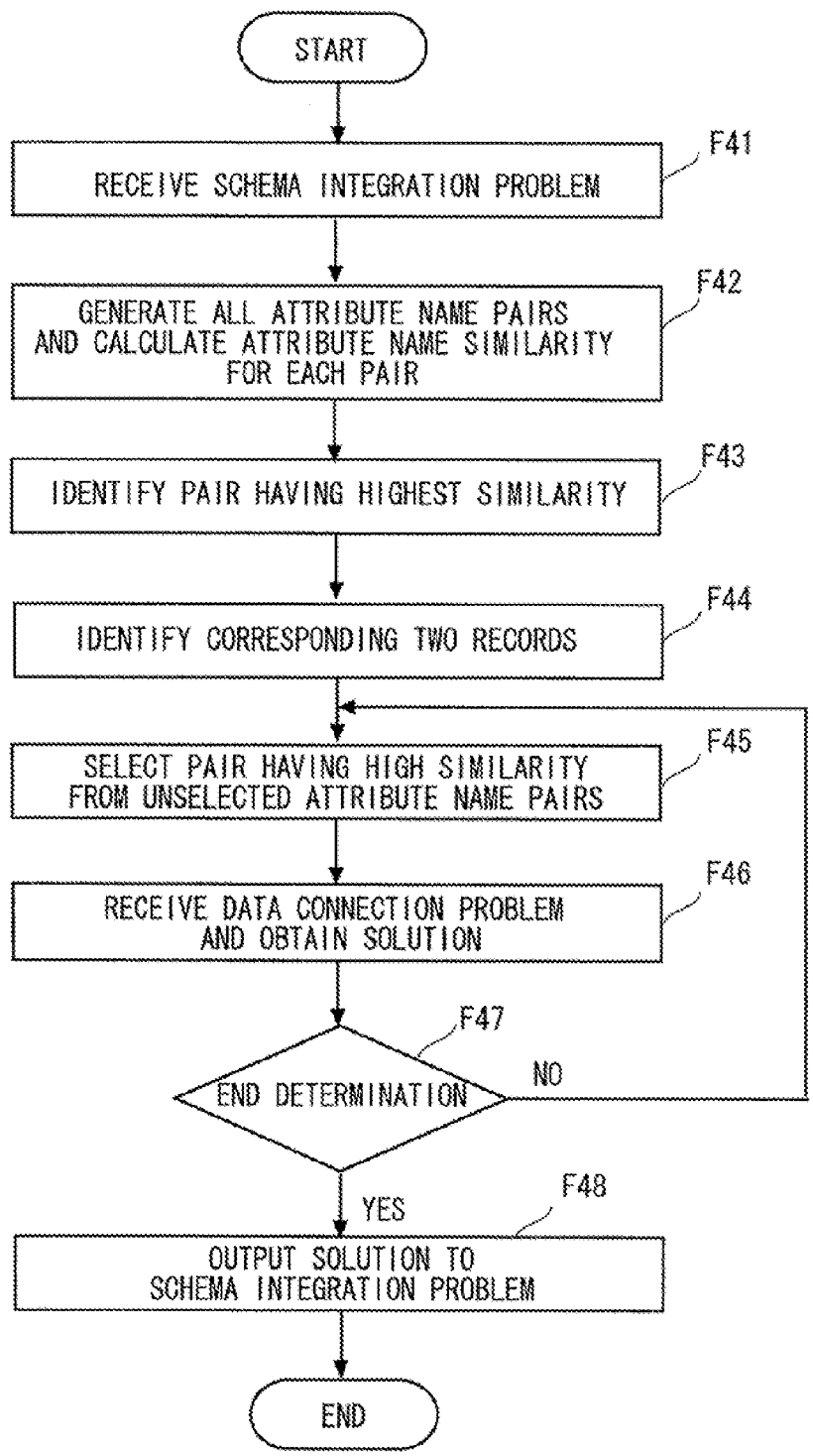
FIG. 26 is a flowchart showing an example of the operation of the schema integration unit.

FIG. 26 is a flowchart showing an example of the operation of the schema integration unit 23. The schema integration unit 23 is activated when receiving a schema integration problem (a pre-conversion schema and a set of records thereof and a post-conversion schema and a set of records thereof) via the conversion module generation means 21. When receiving the schema integration problem, the schema integration problem input and output unit 24 passes the schema integration problem on to the schema integration search unit 233 (step F41).

The schema integration search unit 233 passes the schema integration problem on to the record comparison unit 231. When receiving the schema integration problem, the record comparison unit 231 generates all pairs of an attribute name of the pre-conversion schema and an attribute name of the post-conversion schema. Then, the record comparison unit 231 passes a set of the pairs of two attribute names and the attribute values of these attribute names on to the attribute name similarity obtaining unit 232 and causes the attribute name similarity obtaining unit 232 to obtain the similarities between the attribute names (step F42).

In step F42, the attribute name similarity obtaining unit 232 receives the pairs of two attribute names and the attribute values of these attribute names and obtains the similarities between the attribute names. Hereafter, an explanation will be given taking, as an example, a case where the attribute name similarities are obtained by performing an additional operation on similarities obtained by the attribute knowledge storage unit 13. First, the attribute name similarity obtaining unit 232 causes the attribute knowledge storage unit 13 to obtain the similarity between each two attribute names. Also, the attribute name similarity obtaining unit 232 compares an attribute value of one attribute name with an attribute value of the other attribute name to obtain the ratio of same attribute values. For example, the attribute name similarity obtaining unit 232 counts the number of attribute values common to the attribute values of one attribute name (e.g., attribute name A) and the attribute values of the other attribute name (e.g., attribute name B) and calculates the ratio of the counted number to the number of the attribute values of one attribute name (attribute name A or B). The attribute name similarity obtaining unit 232 calculates a linear combination (e.g., average) between the similarities obtained by the attribute knowledge storage unit 13 and the ratio of the above-mentioned attribute values and returns the calculation result to the record comparison unit 231 as the similarity between the two attribute names.

After step F42, the record comparison unit 231 identifies a pair having the highest similarity among all the pairs of an attribute name of the pre-conversion schema and an attribute name of the post-conversion schema (step F43). The record comparison unit 231 compares the attribute values of the pre-conversion attribute name of the pair with the attribute values of the post-conversion attribute name of the pair and identifies records including an identical attribute value among the conversion-source records and the post-conversion records (step F44). The records identified in step F44 are corresponding records.

For example, assume that, in step F43, a pair of the attribute name "telephone" and the attribute name "Tel" has been identified as a pair having the highest similarity. In this case, in step F44, the record comparison unit 231 compares the attribute values of the attribute name "telephone" with the attribute values of the attribute name "Tel" and extracts records "dansei, 0774xxxx, . . . " and "M, 0774xxxx, . . . ", which contain the same attribute value (e.g., "0774xxxx"), from the conversion-source records and the post-conversion records, respectively.

The record comparison unit 231 selects a pair having the highest similarity from among the unselected attribute name pairs (step F45). Also, the record comparison unit 231 extracts the attribute values of the conversion-source attribute name of the selected pair and the attribute values of the post-conversion attribute name of the selected pair, from the corresponding records (records identified in step F44). The record comparison unit 231 passes the two attribute names of the selected pair and the extracted attribute values on to the schema integration search unit 233. The extracted attribute values correspond to a modification of a data connection problem.

The schema integration search unit 233 inputs, as a data connection problem, the attribute names and the attribute values received from the record comparison unit 231 into the conversion search means 12 via the data connection problem input and output unit 11. As in the first embodiment, the conversion search means 12, which has received the data connection problem, obtains a conversion path to serve as a solution. The schema integration search unit 233 receives the conversion path from the conversion search means 12 via the data connection problem input and output unit (step F46).

Subsequently, the record comparison unit 231 determines whether to end the process of step 45 (step F47). For example, when there are no longer attribute names that have not been selected in step F45 as a pair among the conversion-source and post-conversion attribute names, the record comparison unit 231 determines that the process of step F45 should be ended. If there remain attribute names that have not been selected in step F45, the record comparison unit 231 moves to step F45 and repeats the processes of steps F45 and later. Alternatively, when a predetermined time elapses since the record comparison unit 231 has first performed the process of step F45 or when the processes starting from step F45 are performed predetermined number of times, the record comparison unit 231 may determine that the process of step F45 should be ended.

In step F45, the record comparison unit 231 selects a pair having the highest similarity from among the unselected attribute name pairs. However, if there are multiple pairs that have a similarity difference equal to or lower than a predetermined threshold and have a common conversion-source attribute name or post-conversion attribute name, the record comparison unit 231 may select the multiple pairs simultaneously. For example, in cases such as one where the similarity of a pair of an attribute name "namae" and an attribute name "first name" and the similarity of a pair of the attribute name "namae" and an attribute name "family name" are each equal to or lower than a threshold, the record comparison unit 231 selects the two pairs simultaneously, since the attribute name "namae" is common to the two pairs. Then, the record comparison unit 231 extracts the respective attribute values of "namae," "first name," and "family name" and passes the extracted attribute values on to the schema integration search unit 233. The schema integration search unit 233 inputs "namae," "first name," and "family name" and the attribute values thereof into the data connection problem input and output unit 11 as a data connection problem.

If the record comparison unit 231 determines that the process of step F45 should be ended (YES in step F47), the schema integration search unit 233 outputs the conversion path received from the conversion search means 12 in the preceding step F46, from the schema integration problem input and output unit 24 (step F48). The combination of conversion paths is a solution to the schema integration problem.

The schema integration search unit 233, which includes the schema integration search unit 233, attribute name similarity obtaining unit 232, and record comparison unit 231, is realized, for example, by a CPU that operates according to the conversion program search program. This CPU may be identical to a CPU for realizing other elements (conversion search means 12 and the like).

Next, a specific example of the operation of this embodiment will be described. FIG. 27 is a diagram showing an example of a schema integration problem. A table A shown in FIG. 27 is an example of a pre-conversion schema and records thereof in a schema integration problem. Similarly, a table B is an example of a post-conversion schema and records thereof in the schema integration problem. Assume that a schema having attribute names "namae," "seibetsu," "telephone," and "address" and records thereof and a schema having attribute names "first name," "family name," "sex," "Tel," and "POS" and records thereof have been inputted as a schema integration problem as illustrated in FIG. 27 (step F41).

The record comparison unit 231 generates all pairs of an attribute name of the pre-conversion schema and an attribute name of the post-conversion schema and causes the attribute name similarity obtaining unit 232 to obtain the similarity between two attribute names forming each pair. In this embodiment, the record comparison unit 231 generates all pairs such as ["namae" and "first name"], ["namae" and "family name"], ["namae" and "sex"], ["namae" and "Tel"], and ["seibetsu" and "first name"] and causes the attribute name similarity obtaining unit 232 to calculate the similarity between attribute names forming each pair.

Next, the record comparison unit 231 identifies a pair having the highest similarity (step F43). In this example, it is assumed that the similarity between ["telephone" and "Tel"] is the highest. The record comparison unit 231 compares the attribute values of the pre-conversion attribute name of the pair with the attribute values of the post-conversion attribute name of the pair and identifies records including the same attribute value among the conversion-source records and the post-conversion records (step S44). For example, various telephone numbers are described as the respective attribute values of "telephone" and "Tel". In this example, "0774xxxx" and "0774xxxx" are matched among the telephone numbers. Accordingly, the record comparison unit 231 identifies "Tarou Tanaka, dansei, 0774xxxx, Nara Prefecture" including that attribute value among the conversion-source records. Similarly, the record comparison unit 231 identifies "Tarou Tanaka, M, 0774xxxx, 610-xxxx" including that attribute value among the post-conversion records. The two records are a conversion-source record and a post-conversion record.

Subsequently, the record comparison unit 231 selects a pair having the highest similarity from among the unselected attribute name pairs (step F45). Also, the record comparison unit 231 extracts an attribute value of the conversion-source attribute name of the selected pair and an attribute value of the post-conversion attribute name of the selected pair, from the records identified in step F44. Here, the record comparison unit 231 selects the attribute names "telephone" and "Tel" and extracts attribute values thereof (both are "0774xxxx"). The schema integration search unit 233 inputs "telephone" and "Tel" and the attribute values thereof into the data connection problem input and output unit 11 and receives a conversion path to serve as a solution to the data connection problem (step F46).

Since there remain unselected attribute names, the step F45 and later are repeated again. For example, assume that a pair having the second highest similarity is a pair of "seibetsu" and "sex." The record comparison unit 231 selects the pair of attribute names and extracts attribute values thereof, "dansei" and "M," from among the records identified in step F44. Then, the schema integration search unit 233. inputs the attribute names and attribute values into the data connection problem input and output unit 11 and receives a conversion path.

The same processes are repeated. The schema integration search unit 233 sequentially receives a conversion path for converting the attribute values of "telephone" into the attribute values of "Tel", a conversion path for converting the attribute values of "seibetsu" into the attribute values of "sex", a conversion path for converting the attribute values of "namae" into the attribute values of "first name" and "family name," and a conversion path for converting the attribute values of "address" into the attribute values of "POS." When there are no longer unselected attribute names (Yes in step F47), the schema integration search unit 233 outputs these conversion paths (step F48).

In this embodiment, when receiving a schema integration problem, the schema integration search unit 233 associates attribute names of a pre-conversion schema with attribute names of a post-conversion schema and identifies the associated attribute names and attribute values thereof. Then, the conversion search means 12 considers the attribute names and attribute values as a data connection problem and obtains a conversion path. This allows accurately obtaining a solution to the schema integration problem. Also, even when the description formats of attribute values are different, this embodiment allows accurately obtaining a solution to a schema integration problem within a short processing time without performing conversions comprehensively to obtain a solution to the schema integration problem.

The conversion program search system according to this embodiment can be applied to schema integration applications for integrating databases to solve schema integration problems accurately.

Also, in integrating databases or linking systems within a company or between companies, this embodiment is applicable to applications for resolving the difference between schemas.

The conversion program search system according to this embodiment may include a conversion module registration unit 20 that operates, as in the second embodiment. In this case, advantages similar to those of the second embodiment can be obtained. The conversion program search system according to this embodiment may include a conversion module generation unit 21 that operates as in the third embodiment. In this case, advantages similar to those of the third embodiment can be obtained.

Figure 28:
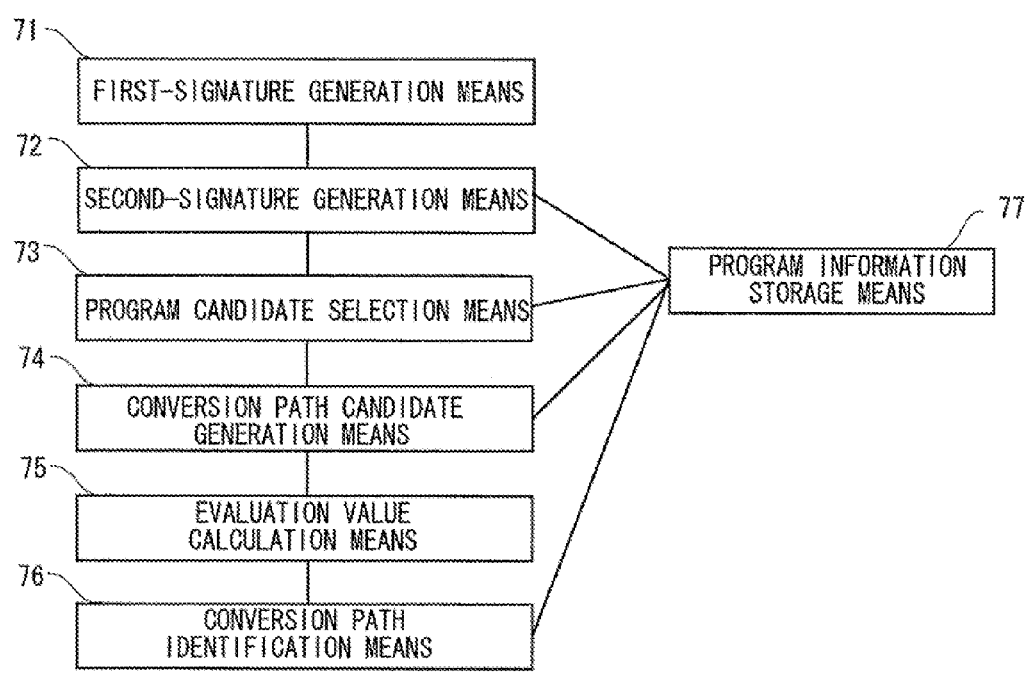
FIG. 28 is a diagram showing an outline of the present invention.

FIG. 28 is a diagram showing an outline of the present invention. The conversion program search system according to the present invention includes first-signature generation means 71 that generates a first signature which is information indicating, in a binary fashion, whether one piece of data meets each of predetermined multiple description formats. Second-signature generation means 72 causes the first-signature generation means 71 to generate the first signature of conversion-source data and the first signature of post-conversion data, and generates a second signature, which is metadata about a conversion program, based on the difference between both first signatures.

Program information storage means 77 stores the names of input data and output data of a conversion program and execution definition information for executing the conversion program. The second-signature generation means 72 additionally stores the generated second signature in the program information storage means 77.

When receiving the name of the conversion-source data, the name of the post-conversion data, and a conversion example including the pre-conversion data and post-conversion data, program candidate selection means 73 selects candidates for conversion programs to be used in a data conversion process, based on the similarity between the received conversion-source data name and the name of input data of a conversion program and the similarity between the received post-conversion data name and the name of output data of the conversion program.

With respect to combinations of the candidates selected by the program candidate selection means 73, conversion path candidate generation means 74 associates the name of the pre-conversion data and the name of input data of a conversion program and associates the name of output data of the conversion program and the name of the post-conversion data. When a combination of the selected candidates includes multiple conversion programs, the conversion path candidate generation means 74 generates a conversion path candidate by associating the name of output data of a conversion program with the name of input data of another candidate conversion program. Evaluation value calculation means 75 calculates the evaluation values of conversion path candidates, based on the second signature of a conversion program that has associated the names of input data and output data with the name of another data and based on a conversion example.

Conversion path identification means 76 selects a conversion path candidate in the descending order of the evaluation values and converts the' received conversion-source data in the order of conversion programs determined by the selected conversion path. If the conversion result is the received post-conversion data, the conversion path identification means 76 identifies the selected conversion path candidate as a conversion path matching the received conversion-source data name, post-conversion data name, and conversion example.

As seen, in the present invention, the second signature, which is metadata about a conversion program, is previously obtained using the first signature of the conversion-source data and the first signature of the post-conversion data. The evaluation value calculation means 75 calculates the evaluation values of the conversion path candidates using the second signatures of the conversion programs used when generating the conversion path candidates. The conversion path candidates are selected in the descending order of the evaluation values. This allows generating the second signature indicating characteristics of a conversion module from a view point that humans do not recognize and determining the order in which the conversion path candidates are selected.

If the same result as the conversion example is obtained by actually trying the selected conversion path candidate, the selected candidate is identified as a solution to the data connection problem. This eliminates the need to try conversions with respect to all the conversion path candidates.

Such a configuration realizes an improvement in reusability of conversion programs, as well as realizes an increase in efficiency of the process of identifying a conversion path.

Also disclosed as an embodiment of the present invention is a configuration that include: pair identification means that receives a pre-conversion schema including the attribute names of multiple attributes defining an object or event, a set of records that is a combination of attribute values corresponding to the attribute names of the pre-conversion schema, a post-conversion schema obtained by converting the pre-conversion schema, a set of records that is a combination of attribute values corresponding to the attribute names of the post-conversion schema and identifies a pair having the highest attribute name similarity among pairs of an attribute name of the pre-conversion schema and an attribute name of the post-conversion schema; record identification means that compares the attribute value of the pre-conversion attribute name of the identified pair with the attribute value of the post-conversion attribute name of the identified pair and identifies records including an identical attribute value among pre-conversion records and post-conversion records; and attribute value extraction means that extracts the attribute values contained in the conversion-source records and the attribute values contained in the post-conversion records identified by the record identification means in the descending order of the similarities of the attribute name pairs and where the program candidate selection means selects a conversion path candidate while using the attribute values extracted from the conversion-source records and the post-conversion records by the attribute value extraction means as a conversion example and using the attribute names of the attribute values extracted from the conversion-source records and the post-conversion records as the names of the pre-conversion data and the names of the post-conversion data, respectively.

Also disclosed as an embodiment of the present invention is a configuration that includes conversion program registration means that considers the conversion path identified by the conversion path identification means as a new conversion program and stores the names of input data and output data of the conversion path as well as execution definition information in the program information storage means and where the second-signature generation means generates the second signature with respect to the conversion path and stores the second signature in the program information storage means.

Also disclosed as an embodiment of the present invention is a configuration that includes: dictionary program storage means that stores a dictionary program for obtaining post-conversion data from pre-conversion data using a specified dictionary; dictionary generation means that, when receiving an attribute value of an attribute serving as a primary key and an attribute value of another attribute corresponding to the primary key, generates a dictionary associating the attribute value of the primary key with the attribute value of the another attribute while using the attribute value of the primary key as pre-conversion data and the attribute value of the another attribute as post-conversion data; and conversion module generation means that, by providing specification of the dictionary generated by the dictionary generation means to the dictionary program, generates a new conversion program having the specified dictionary and stores the names of input data and output data of the new conversion program and execution definition information in the program information storage means and where the second-signature generation means generates the second signature with respect to the new conversion program and stores the generated second signature in the program information storage means.

Also disclosed as an embodiment of the present invention is a configuration where the conversion path candidate generation means generates a first group including the names of pieces of conversion-source data and a second group including a conversion module and the names of post-conversion data, associates the names contained in the first group with the names of pieces of input data of the conversion module contained in the second group, eliminates the associated names from the first group and adds the names of pieces of output data of the conversion module to the first group, and when there is no longer conversion module in the second group, generates conversion path candidates by associating the names contained in the first group with the names of the pieces of post-conversion data contained in the second group.

This application is the National Phase of PCT/JP2008/063673, filed Jul. 30, 2008, which claims priority based on Japanese Patent Application No. 2007-200852 filed on Aug. 1, 2007 and includes all the disclosure thereof.

Industrial Applicability

The present invention is applicable to applications for searching for and executing conversion modules contained in a solution to a data connection problem in linking systems within a company or between companies.

The invention claimed is:

1. A conversion program search system that, according to a name of conversion-source data, a name of post-conversion data, and a conversion example including the conversion-source data and the post-conversion data, identifies a conversion path which is information indicating a relationship among the conversion-source data, the post-conversion data, input data of one or more conversion programs, and output data outputted by the one or more conversion programs, the conversion program search system comprising:

hardware including a processor;

first-signature generation unit implemented at least by the hardware and that generates a first signature which is information indicating, in a binary manner, whether one piece of data meets each of a predetermined plurality of description formats;

second-signature generation unit implemented at least by the hardware and that generates a second signature based on a difference between the first signature of the conversion-source data and the first signature of the post-conversion data generated by the first-signature generation unit, the second signature being metadata about the conversion program;

program information storage unit implemented at least by the hardware and that stores names of input data and output data of the conversion program, execution definition information for executing the conversion program, and the second signature generated by the second-signature generation unit;

program candidate selection unit implemented at least by the hardware and that, when receiving the name of the conversion-source data, the name of the post-conversion data, and the conversion example including the conversion-source data and the post-conversion data, selects candidates for conversion programs to be used in a data conversion process, based on a similarity between the received conversion-source data name and the name of the input data of the conversion program and a similarity between the received post-conversion data name and the name of output data of the conversion program;

conversion path candidate generation unit implemented at least by the hardware and that, with respect to combinations of the candidates selected by the program candidate selection unit, associates the name of the conversion-source data with the name of input data of the conversion program and associates the name of output data of the conversion program with the name of the post-conversion data and that, when a combination of the selected candidates includes a plurality of conversion programs, generates a conversion path candidate by associating the name of output data of the conversion program with a name of input data of another candidate conversion program;

evaluation value calculation unit implemented at least by the hardware and that calculates evaluation values of conversion path candidates based on the second signature of the conversion program and the conversion example, the conversion program having associated names of input data and output data with a name of another piece of data; and conversion path identification unit implemented at least by the hardware and that selects the conversion path candidates in a descending order of the evaluation values, converts the received conversion-source data in an order of conversion programs determined by the selected conversion path and, when a result of the conversion is the received post-conversion data, identifies the selected conversion path candidate as the conversion path matching the received conversion-source data name, post-conversion data name, and the conversion example.

2. The conversion program search system according to claim 1, further comprising:

pair identification unit that receives a conversion-source schema including attribute names of a plurality of attributes defining an object or event, a set of records that is a combination of attribute values corresponding to the attribute names of the conversion-source schema, a post-conversion schema obtained by converting the conversion-source schema, and a set of records that is a combination of attribute values corresponding to attribute names of the post-conversion schema and identifies a pair having a highest similarity among pairs of an attribute name of the conversion-source schema and an attribute name of the post-conversion schema;

record identification unit that compares an attribute value of a conversion-source attribute name of the identified pair with an attribute value of a post-conversion attribute name of the identified pair and identifies records including an identical attribute value among conversion-source records and post-conversion records; and attribute value extraction unit that extracts attribute values contained in the conversion-source records and attribute values contained in the post-conversion records identified by the record identification unit in the descending order of the similarities of the attribute name pairs, wherein the program candidate selection unit selects a conversion path candidate while using the attribute values extracted from the conversion-source records and the post-conversion records by the attribute value extraction unit as a conversion example and using attribute names of the attribute values extracted from the conversion-source records and attribute names of the attribute values extracted from the post-conversion records as names of pieces of conversion-source data and names of pieces of post-conversion data, respectively.

3. The conversion program search system according to claim 1, further comprising conversion program registration unit that considers the conversion path identified by the conversion path identification unit as a new conversion program and stores names of input data and output data of the conversion path and execution definition information in the program information storage unit, wherein the second-signature generation unit generates a second signature with respect to the conversion path and stores the second signature in the program information storage unit.

4. The conversion program search system according to claim 1, further comprising:

dictionary program storage unit that stores a dictionary program for obtaining post-conversion data from pre-conversion data using a specified dictionary;

dictionary generation unit that, when receiving an attribute value of an attribute serving as a primary key and an attribute value of another attribute corresponding to the primary key, generates a dictionary associating the attribute value of the primary key with the attribute value of the another attribute while using the attribute value of the primary key as pre-conversion data and the attribute value of the another attribute as post-conversion data; and conversion module generation unit that, by providing specification of the dictionary generated by the dictionary generation unit to a dictionary program, generates a new conversion program having the specified dictionary and stores names of input data and output data of the new conversion program and execution definition information in the program information storage unit, wherein the second-signature generation unit generates a second signature with respect to the new conversion program and stores the generated second signature in the program information storage unit.

5. The conversion program search system according to claim 1, wherein the conversion path candidate generation unit generates a first group including names of pieces of conversion-source data and a second group including a conversion module and names of pieces of post-conversion data, associates the names contained in the first group with names of pieces of input data of the conversion module contained in the second group, eliminates the associated names from the first group and adds names of pieces of output data of the conversion module to the first group, and when there is no longer conversion module in the second group, generates conversion path candidates by associating the names contained in the first group with the names of the pieces of post-conversion data contained in the second group.

6. A conversion program search method for, according to a name of conversion-source data, a name of post-conversion data, and a conversion example including the conversion-source data and the post-conversion data, identifying a conversion path which is information indicating a relationship between the conversion-source data, the post-conversion data, input data of one or more conversion programs, and output data outputted by the one or more conversion programs, the conversion program search method comprising:
  generating a first signature with respect to each of the conversion-source data and the post-conversion data, by using first-signature generation unit, the first signature being information indicating, in a binary manner, whether one piece of data meets each of a predetermined plurality of description formats;
  generating a second signature based on a difference between the first signature of the conversion-source data and the first signature of the post-conversion data generated by the first-signature generation unit, by using second-signature generation unit, the second signature being metadata about the conversion program;
  storing the second signature in program information storage unit, by using the second-signature generation unit, the program information storage unit previously storing names of input data and output data of the conversion program and execution definition information for executing the conversion program;
  when receiving a name of conversion-source data, a name of post-conversion data, and the conversion example including conversion-source data and post-conversion data, selecting a conversion program candidate to be used in a data conversion process, based on a similarity between the received conversion-source data name and a name of input data of the conversion program and a similarity between the received post-conversion data name and a name of output data of the conversion program, by using program candidate selection unit;
  with respect to combinations of the candidates selected by the program candidate selection unit, associating a name of conversion-source data with the name of input data of the conversion program and associating the name of output data of the conversion program with a name of a post-conversion data, by using conversion path candidate generation unit and, when a combination of the selected candidates contains a plurality of conversion programs, generating a conversion path candidate by associating the name of output data of the conversion program with a name of input data of another candidate conversion program, by using the conversion path candidate generation unit;
  calculating an evaluation value of the conversion path candidate based on the second signature of the conversion program and the conversion example, by using evaluation value calculation unit, the conversion program having associated names of input data and output data with a name of another piece of data; and
  selecting a conversion path candidate in a descending order of the evaluation values, converting the received conversion-source data in an order of conversion programs determined by the selected conversion paths, by using conversion path identification unit and, when a result of the conversion is the received post-conversion data, identifying the selected conversion path candidate as the conversion path matching the received conversion-source data name, post-conversion data name, and the conversion example, by using the conversion path identification unit.

7. The conversion program search method according to claim 6, further comprising:
  when receiving a conversion-source schema including attribute names of a plurality of attributes defining an object or event, a set of records that is a combination of attribute values corresponding to the attribute names of the conversion-source schema, a post-conversion schema obtained by converting the conversion-source schema, and a set of records that is a combination of attribute values corresponding to attribute names of the post-conversion schema, identifying a pair having a highest similarity among pairs of an attribute name of the conversion-source schema and an attribute name of the post-conversion schema, by using pair identification unit;
  comparing an attribute value of a conversion-source attribute name of the identified pair with an attribute value of a post-conversion attribute name of the identified pair and identifying records including an identical attribute value among conversion-source records and post-conversion records, by using record identification unit; and
  extracting the attribute values contained in the conversion-source records and the attribute values contained in the post-conversion records identified by the record identification unit in the descending order of the similarities of the attribute name pairs, by using attribute value extraction unit,
  wherein the program candidate selection unit selects a conversion path candidate while using the attribute values extracted from the conversion-source records and the post-conversion records by the attribute value extraction unit as a conversion example and using attribute names of the attribute values extracted from the conversion-source records and attribute names of the attribute values extracted from the post-conversion records as names of pieces of conversion-source data and names of pieces of post-conversion data, respectively.

8. The conversion program search method according to claim 6, further comprising considering the conversion path identified by the conversion path identification unit as a new conversion program and storing names of input data and output data of the conversion path and execution definition information in the program information storage unit, by using conversion program registration unit, wherein the second-signature generation unit generates the second signature with respect to the conversion path and stores the second signature in the program information storage unit.

9. The conversion program search method according to claim 6, further comprising:
previously storing a dictionary program for obtaining post-conversion data from pre-conversion data using a specified dictionary, by using dictionary program storage unit;
when receiving an attribute value of an attribute serving as a primary key and an attribute value of another attribute corresponding to the primary key, generating a dictionary associating the attribute value of the primary key with the attribute value of the another attribute, by using dictionary generation unit while using the attribute value of the primary key as pre-conversion data and using the attribute value of the another attribute as post-conversion data; and
by providing specification of the dictionary generated by the dictionary generation unit to the dictionary program, generating a new conversion program having the specified dictionary and storing names of input data and output data of the new conversion program and execution definition information in the program information storage unit, by using conversion module generation unit,
wherein the second-signature generation unit generates the second signature with respect to the new conversion program and stores the generated second signature in the program information storage unit.

10. The conversion program search method according to claim 6, wherein the conversion path candidate generation unit generates a first group including names of pieces of conversion-source data and a second group including a conversion module and names of pieces of post-conversion data, associates the names contained in the first group with names of pieces of input data of the conversion module contained in the second group, eliminates the associated names from the first group and adds names of pieces of output data of the conversion module to the first group, and when there is no longer conversion module in the second group, generates a conversion path candidate by associating the names contained in the first group with the names of the pieces of post-conversion data contained in the second group.

11. A non-transitory computer-readable storage medium recording a conversion program search program for causing a computer to, according to a name of conversion-source data, a name of post-conversion data, and a conversion example including the conversion-source data and the post-conversion data, identify a conversion path which is information indicating a relationship among the conversion-source data, the post-conversion data, input data of one or more conversion programs, and output data outputted by the one or more conversion programs, the computer including program information storage unit storing a names of input data and output data of a conversion program and execution definition information for executing the conversion program, the conversion program search program causing the computer to perform:
a first signature generation process of generating a first signature with respect to each of the conversion-source data and the post-conversion data, the first signature being information indicating, in a binary manner, whether one piece of data meets each of a predetermined plurality of description formats;
a second signature generation process of generating a second signature based on a difference between the first signature of the conversion-source data and the first signature of the post-conversion data generated in the first-signature generation process, the second signature being metadata about the conversion program;
a second signature storage process of storing the second signature in program information storage unit;
a program candidate selection process of, when receiving the name of the conversion-source data, the name of the post-conversion data, and the conversion example including the conversion-source data and the post-conversion data, selecting candidates for conversion programs to be used in a data conversion process, based on a similarity between the received conversion-source data name and a name of input data of the conversion program and a similarity between the received post-conversion data name and a name of output data of the conversion program;
a conversion path candidate generation process of, with respect to combinations of the candidates selected in the program candidate selection process, associating the name of the conversion-source data with the name of the input data of the conversion program and associating the name of the output data of the conversion program with the name of the post-conversion data and, when a combination of the selected candidates contains a plurality of conversion programs, generating conversion path candidates by associating the name of the output data of the conversion program with a name of input data of another candidate conversion program;
an evaluation value calculation process of calculating evaluation values of the conversion path candidates based on the second signature of the conversion program and the conversion example, the conversion program having associated names of input data and output data with a name of another piece of data; and
a conversion path identification process of selecting a conversion path candidate in a descending order of the evaluation values, converting the received conversion-source data in an order of conversion programs determined by the selected conversion path, and, when a result of the conversion is the received post-conversion data, identifying the selected conversion path candidate as the conversion path matching the received conversion-source data name, post-conversion data name, and the conversion example.

12. The non-transitory computer-readable storage medium according to claim 11, the conversion program search program causing the computer to further perform:
a pair identification process of, when receiving a conversion-source schema including attribute names of a plurality of attributes defining an object or event, a set of records that is a combination of attribute values corresponding to the attribute names of the conversion-source schema, a post-conversion schema obtained by converting the conversion-source schema, and a set of records that is a combination of attribute values corresponding to attribute names of the post-conversion schema, identifying a pair having a highest similarity among pairs of an attribute name of the conversion-source schema and an attribute name of the post-conversion schema;
a record identification process of comparing an attribute value of a conversion-source attribute name of the identified pair with an attribute value of a post-conversion attribute name of the identified pair, and identifying records including an identical attribute value among conversion-source records and post-conversion records; and
an attribute value extraction process of extracting the attribute values contained in the conversion-source records and the attribute values contained in the post-conversion records identified by the record identification process in the descending order of the similarities of the attribute name pairs,
wherein in the program candidate selection process, the conversion program candidates are selected while using the attribute values extracted from the conversion-source records and the post-conversion records as a conversion example and using attribute names of the attribute values extracted from the conversion-source records and attribute names of the attribute values extracted from the post-conversion records as names of pieces of conversion-source data and names of pieces of post-conversion data, respectively.

13. The non-transitory computer-readable storage medium according to claim 11, the conversion program search program causing the computer to further perform:
  a conversion program registration process of considering the conversion path identified in the conversion path identification process as a new conversion program and storing names of input data and output data of the conversion path and execution definition information in the program information storage unit; and
  a process of generating the second signature with respect to the conversion path and storing the second signature in the program information storage unit.

14. The non-transitory computer-readable storage medium according to claim 11, the computer including dictionary program storage unit storing a dictionary program for obtaining post-conversion data from pre-conversion data using a specified dictionary, the conversion program search program causing the computer to further perform:
  a dictionary generation process of, when receiving an attribute value of an attribute serving as a primary key and an attribute value of another attribute corresponding to the primary key, generating a dictionary associating the attribute value of the primary key with the attribute value of the another attribute while using the attribute value of the primary key as pre-conversion data and the attribute value of the another attribute as post-conversion data;
  a conversion module generation process of, by providing specification of the dictionary generated by the dictionary generation process to the dictionary program, generating a new conversion program having the specified dictionary and storing names of input data and output data of the new conversion program and execution definition information in the program information storage unit; and
  a process of generating the second signature with respect to the new conversion program and storing the generated second signature in the program information storage unit.

15. The non-transitory computer-readable storage medium according to claim 11, wherein in the conversion path candidate generation process, the conversion program search program causes the computer to generate a first group including names of pieces of conversion-source data and a second group including a conversion module and names of pieces of post-conversion data, associate the names contained in the first group with names of pieces of input data of the conversion module contained in the second group, eliminate the associated names from the first group and add names of pieces of output data of the conversion module to the first group, and when there is no longer conversion module in the second group, and generate conversion path candidates by associating the names contained in the first group with the names of the pieces of post-conversion data contained in the second group.

16. A conversion program search system that, according to a name of conversion-source data, a name of post-conversion data, and a conversion example including the conversion-source data and the post-conversion data, identifies a conversion path which is information indicating a relationship among the conversion-source data, the post-conversion data, input data of one or more conversion programs, and output data outputted by the one or more conversion programs, the conversion program search system comprising:
  hardware including a processor;
  first-signature generation means implemented at least by the hardware and that generates a first signature which is information indicating, in a binary manner, whether one piece of data meets each of a predetermined plurality of description formats;
  second-signature generation means implemented at least by the hardware and that generates a second signature based on a difference between the first signature of the conversion-source data and the first signature of the post-conversion data generated by the first-signature generation means, the second signature being metadata about the conversion program;
  program information storage means implemented at least by the hardware and that stores names of input data and output data of the conversion program, execution definition information for executing the conversion program, and the second signature generated by the second-signature generation means;
  program candidate selection means implemented at least by the hardware and that, when receiving the name of the conversion-source data, the name of the post-conversion data, and the conversion example including the conversion-source data and the post-conversion data, selects candidates for conversion programs to be used in a data conversion process, based on a similarity between the received conversion-source data name and the name of the input data of the conversion program and a similarity between the received post-conversion data name and the name of output data of the conversion program;
  conversion path candidate generation means implemented at least by the hardware and that, with respect to combinations of the candidates selected by the program candidate selection means, associates the name of the conversion-source data with the name of input data of the conversion program and associates the name of output data of the conversion program with the name of the post-conversion data and that, when a combination of the selected candidates includes a plurality of conversion programs, generates a conversion path candidate by associating the name of output data of the conversion program with a name of input data of another candidate conversion program;
  evaluation value calculation means implemented at least by the hardware and that calculates evaluation values of conversion path candidates based on the second signature of the conversion program and the conversion example, the conversion program having associated names of input data and output data with a name of another piece of data; and
  conversion path identification means implemented at least by the hardware and that selects the conversion path candidates in a descending order of the evaluation values, converts the received conversion-source data in an order of conversion programs determined by the selected conversion path and, when a result of the conversion is the received post-conversion data, identifies the selected conversion path candidate as the conversion path matching the received conversion-source data name, post-conversion data name, and the conversion example.

* * * * *